(12) United States Patent
Koike et al.

(10) Patent No.: US 10,800,555 B2
(45) Date of Patent: Oct. 13, 2020

(54) BAG MAKING AND PACKAGING MACHINE

(71) Applicant: ISHIDA CO., LTD., Kyoto-shi, Kyoto (JP)

(72) Inventors: Shinji Koike, Ritto (JP); Ryoichi Sato, Ritto (JP); Ryo Sasaki, Ritto (JP)

(73) Assignee: ISHIDA CO., LTD., Kyoto (JP)

( * ) Notice: Subject to any disclaimer, the term of this patent is extended or adjusted under 35 U.S.C. 154(b) by 125 days.

(21) Appl. No.: 15/779,086

(22) PCT Filed: Oct. 3, 2016

(86) PCT No.: PCT/JP2016/079343
§ 371 (c)(1),
(2) Date: May 25, 2018

(87) PCT Pub. No.: WO2017/094342
PCT Pub. Date: Jun. 8, 2017

(65) Prior Publication Data
US 2018/0354661 A1   Dec. 13, 2018

(30) Foreign Application Priority Data

Nov. 30, 2015  (JP) .................................. 2015-232612

(51) Int. Cl.
*B65B 57/00* (2006.01)
*B65B 1/32* (2006.01)
(Continued)

(52) U.S. Cl.
CPC .................. *B65B 1/32* (2013.01); *B65B 9/10* (2013.01); *B65B 51/30* (2013.01); *B65B 57/00* (2013.01);
(Continued)

(58) Field of Classification Search
CPC ............ B29C 65/7451; B29C 66/4312; B29C 66/8246; B29C 66/961; B29C 66/90
See application file for complete search history.

(56) References Cited

U.S. PATENT DOCUMENTS 5,724,786 A * 3/1998 Singh ...................... B29C 65/08
53/249
6,421,981 B1 * 7/2002 Nakagawa ............ B65B 51/306
53/58

(Continued)

FOREIGN PATENT DOCUMENTS

JP    1999-321809 A    11/1999
JP    2003-011927 A    1/2003
(Continued)

OTHER PUBLICATIONS

Search Report from the corresponding International Patent Application No. PCT/JP2016/079343 dated Dec. 27, 2016.
(Continued)

*Primary Examiner* — Andrew M Tecco
(74) *Attorney, Agent, or Firm* — Shinjyu Global IP

(57) ABSTRACT

Provided is a bag making and packaging machine capable of accurately detecting, with a simple configuration, the timing at which an article that is dropped and supplied from an article supply device disposed above the bag making and packaging machine, will arrive at a lateral sealing mechanism. A bag making and packaging machine receives articles dropped and supplied from a combination weighing machine disposed above the bag making and packaging machine and packages the articles in a bag to be made. The bag making and packaging machine includes a lateral sealing mechanism, a servo motor, and a falling time detector. The lateral sealing mechanism laterally seals a packaging material of a cylindrical shape. The servo motor drives the lateral sealing mechanism.

4 Claims, 10 Drawing Sheets

(51) Int. Cl.
   *B65B 9/10* (2006.01)
   *B65B 51/30* (2006.01)
   *B29C 65/74* (2006.01)
   *B29C 65/00* (2006.01)
   *B29C 65/18* (2006.01)

(52) U.S. Cl.
   CPC .......... *B29C 65/18* (2013.01); *B29C 65/7451* (2013.01); *B29C 66/1122* (2013.01); *B29C 66/4312* (2013.01); *B29C 66/7373* (2013.01); *B29C 66/8225* (2013.01); *B29C 66/8246* (2013.01); *B29C 66/83543* (2013.01); *B29C 66/8491* (2013.01); *B29C 66/9241* (2013.01); *B29C 66/9261* (2013.01)

(56) References Cited

U.S. PATENT DOCUMENTS

| | | | |
|---|---|---|---|
| 7,579,558 B2 * | 8/2009 | Higuchi | B65B 1/32 177/25.18 |
| 8,356,455 B2 * | 1/2013 | Sato | B29C 65/18 53/502 |
| 2002/0121076 A1 * | 9/2002 | Nakagawa | B65B 51/306 53/493 |
| 2010/0242416 A1 * | 9/2010 | Sato | B29C 65/18 53/494 |
| 2013/0059709 A1 * | 3/2013 | Miyamoto | B29C 66/1122 493/186 |

FOREIGN PATENT DOCUMENTS

| | | |
|---|---|---|
| JP | 2003-072720 A | 3/2003 |
| JP | 2005-104512 A | 4/2005 |
| JP | 2009-227288 A | 10/2009 |
| JP | 2012-250756 A | 12/2012 |

OTHER PUBLICATIONS

Preliminary Report on Patentability (with Written Opinion) from the corresponding International Patent Application No. PCT/JP2016/079343 dated Jun. 14, 2018.

* cited by examiner

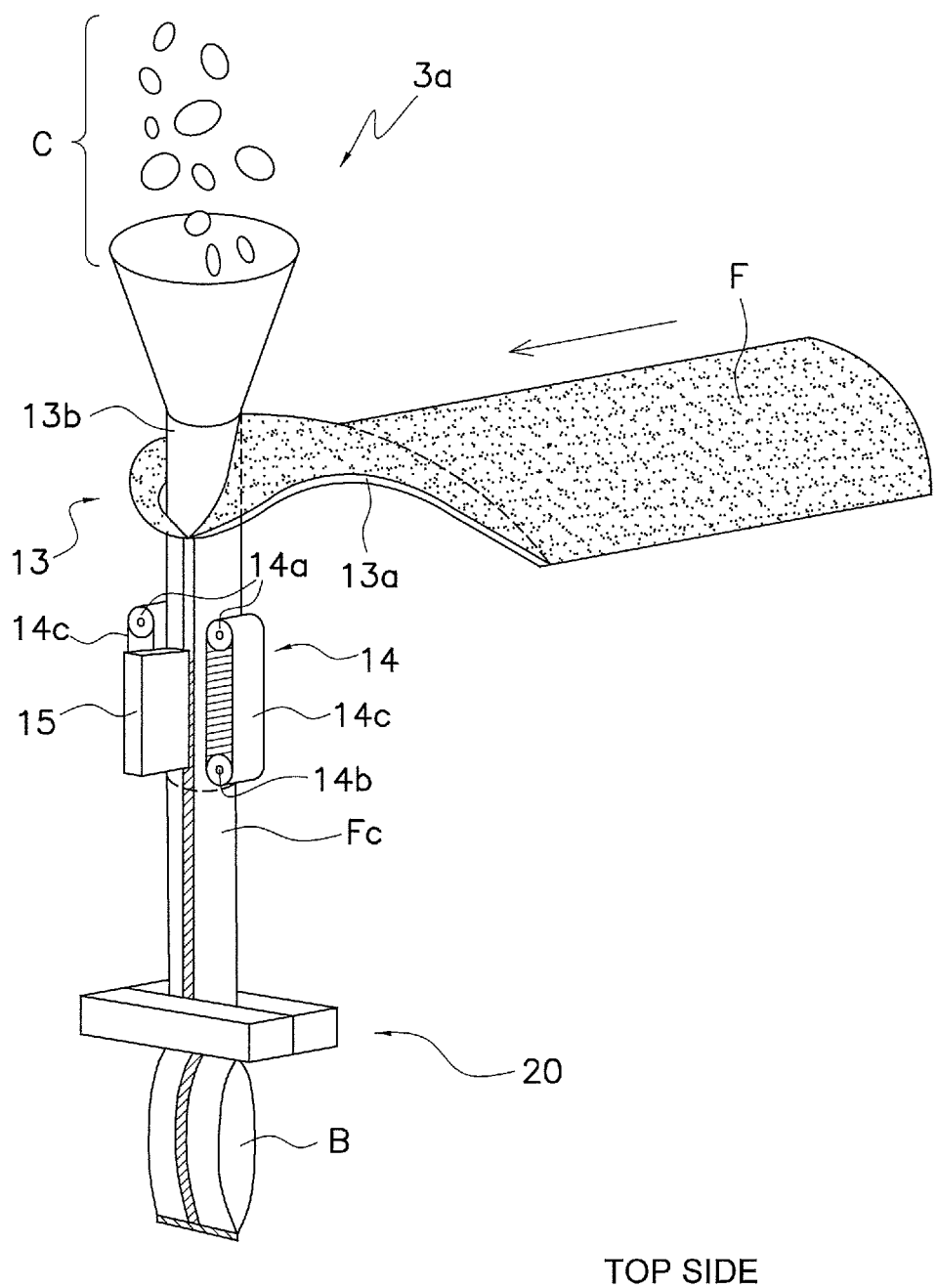
F I G. 2

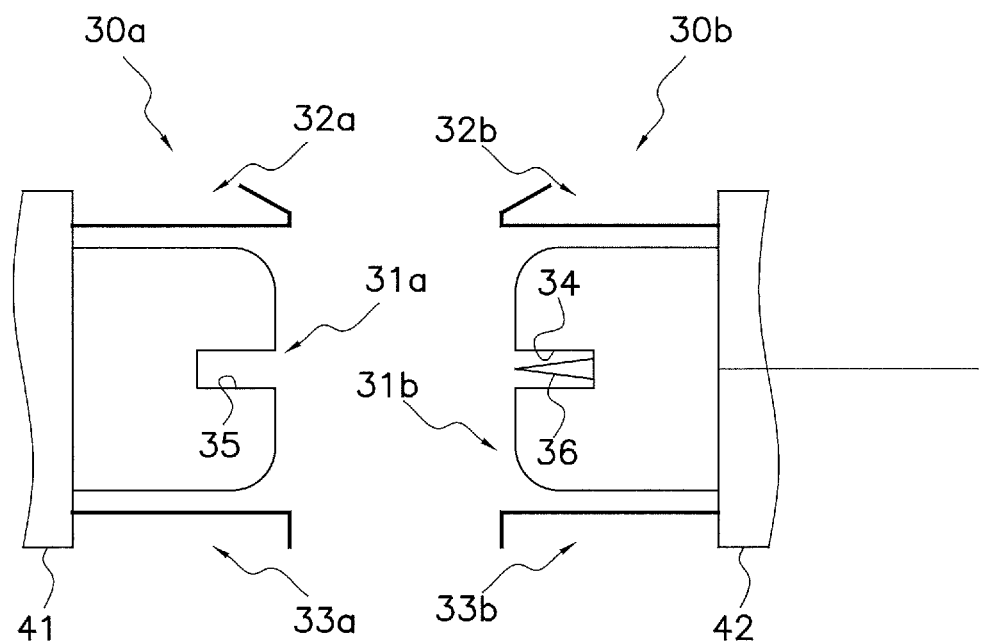
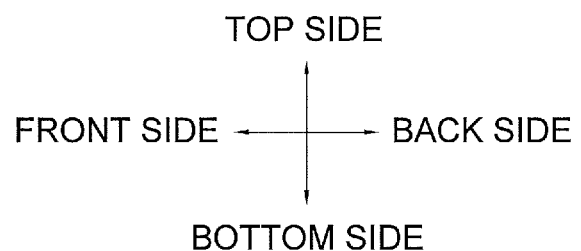
F I G. 5 A

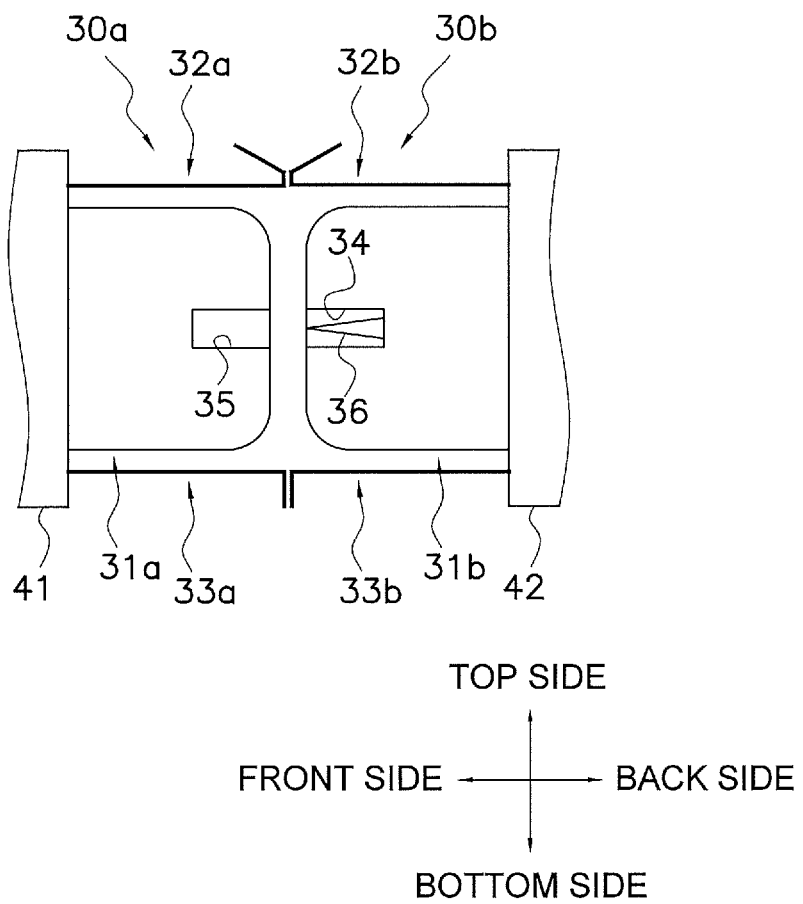
F I G. 5 B

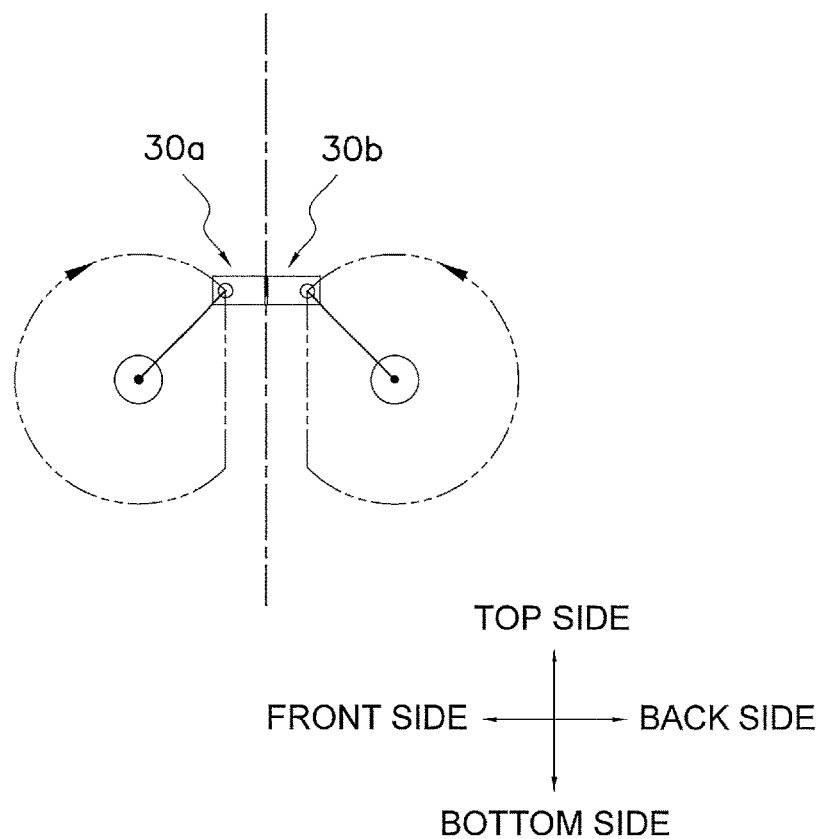
F I G. 9

BAG MAKING AND PACKAGING MACHINE

PRIORITY

This is a National Stage Application under 35 U.S.C. § 365 of International Application PCT/JP2016/079343, with an international filing date of Oct. 3, 2016, which claims priority to Japanese Patent Application No. 2015-232612 filed on Nov. 30, 2015. The entire disclosures of International Application PCT/JP2016/079343 and Japanese Patent Application No. 2015-232612 are hereby incorporated herein by reference.

TECHNICAL FIELD

Certain implementations may relate to a bag making and packaging machine. Certain implementations may relate to a bag making and packaging machine that receives articles dropped and supplied from an article supply device disposed above the bag making and packaging machine, and packages the articles in a bag to be made.

BACKGROUND

In the related art, there are known configurations for bag making and packaging machines which grasp the timing at which an article, dropped and supplied from an article supply device disposed above the bag making and packaging machine, arrives at a lateral sealing mechanism, which laterally seals a cylinder-shaped packaging material that becomes a packaging bag. Such configurations are provided for purposes such as preventing biting at the lateral seal portion of the packaging bag and improving the processing speed of the bag making and packaging machine.

For example, a bag making and packaging machine may include a photoelectric sensor for detecting an article that is dropped and supplied from an article supply device and adjusts a timing of an operation of a lateral sealing mechanism or the like based on the detection results of the photoelectric sensor. The photoelectric sensor may detect the article at a location between a discharge outlet for articles of the article supply device and a tube of the bag making and packaging machine through which the articles discharged from the discharge outlet pass.

A bag making and packaging machine may include a sensor for detecting an article that is dropped and supplied from an article supply device, directly above a lateral sealing mechanism. Moreover, a discharge timing of the article from the article supply device may be adjusted with respect to an operation timing of the lateral sealing mechanism based on the detection results of the sensor.

SUMMARY

An object of certain implementations is to provide a bag making and packaging machine that is capable of accurately detecting, with a simple configuration, the timing at which an article that is dropped and supplied from an article supply device, disposed above the bag making and packaging machine, will arrive at a lateral sealing mechanism.

A bag making and packaging machine according to a first aspect of the present invention receives an article dropped and supplied from an article supply device disposed above the bag making and packaging machine and packages the article in a bag to be made. The bag making and packaging machine includes a lateral sealing mechanism, a servo motor, and a falling time detector. The lateral sealing mechanism laterally seals a packaging material of a cylindrical shape. The servo motor drives the lateral sealing mechanism. The falling time detector detects that the article dropped from the article supply device has fallen to the height position of the lateral sealing mechanism based on information related to a torque or an axial rotation amount of the servo motor.

With the bag making and packaging machine according to the first aspect of the present invention, it is possible to detect that the article has fallen to the height position of the lateral sealing mechanism without additionally providing a sensor. As such, it is possible to accurately detect that the article has fallen to the height position of the lateral sealing mechanism while suppressing the cost of the machine.

A bag making and packaging machine according to a second aspect of the present invention is the bag making and packaging machine according to the first aspect, wherein the lateral sealing mechanism includes a first member moving within a passage through which the article dropped and supplied from the article supply device passes. The servo motor includes a first servo motor. The first servo motor drives the first member in at least a vertical direction within the passage through which the article dropped and supplied from the article supply device passes. The falling time detector detects that the article dropped from the article supply device has fallen to the height position of the lateral sealing mechanism based on information related to a torque or an axial rotation amount of the first servo motor.

With the bag making and packaging machine according to the second aspect of the present invention, it is possible to detect that the article has fallen to the height position of the lateral sealing mechanism based on the force in the vertical direction acting on the first member or the movement amount in the vertical direction of the first member.

A bag making and packaging machine according to a third aspect of the present invention is the bag making and packaging machine according to the second aspect, further including a mode switcher. The mode switcher switches between a first mode in which the falling time detector is operated and a second mode in which the falling time detector is not operated. When switched to the first mode, the first member is moved to a position closing the passage through which the article dropped and supplied from the article supply device passes.

With the bag making and packaging machine according to the third aspect of the present invention, it is possible to detect that the article has fallen to the height position of the lateral sealing mechanism by detecting the falling of the article on the first member, based on the information related to the torque or the axial rotation amount of the first servo motor.

A bag making and packaging machine according to a fourth aspect of the present invention is the bag making and packaging machine according to the first aspect, wherein the lateral sealing mechanism includes a second member moving within a passage through which the article dropped and supplied from the article supply device passes. The servo motor includes a second servo motor. The second servo motor drives the second member in at least a horizontal direction within the passage through which the article dropped and supplied from the article supply device passes. The falling time detector detects that the article dropped from the article supply device has fallen to the height position of the lateral sealing mechanism based on information related to a torque or an axial rotation amount of the second servo motor.

With the bag making and packaging machine according to the fourth aspect of the present invention, it is possible to detect that the article has fallen to the height position of the lateral sealing mechanism based on the force in the horizontal direction acting on the second member or the movement amount in the horizontal direction of the second member.

A bag making and packaging machine according to a fifth aspect of the present invention is the bag making and packaging machine according to the fourth aspect, wherein the second member is a pair of sealing jaws.

With the bag making and packaging machine according to the fifth aspect of the present invention, it is possible to detect that the article has fallen to the height position of the lateral sealing mechanism based on the force in the horizontal direction acting on the sealing jaws or the movement amount in the horizontal direction of the sealing jaws.

A bag making and packaging machine according to a sixth aspect of the present invention is the bag making and packaging machine according to the fifth aspect, further includes a mode switcher. The mode switcher switches between a third mode in which the falling time detector is operated and the second mode in which the falling time detector is not operated. When switched to the third mode, the second servo motor moves the sealing jaws so that the pair of sealing jaws repeatedly approach/separate from each other.

With the bag making and packaging machine according to the sixth aspect of the present invention, it is possible to detect that the article has fallen to the height position of the lateral sealing mechanism by detecting a state that the article is sandwiched between the pair of sealing jaws (biting of the article), based on the information related to the torque or the axial rotation amount of the second servo motor.

A bag making and packaging machine according to a seventh aspect of the present invention is the bag making and packaging machine according to any of the first to sixth aspects, further includes a signal receiver. The signal receiver receives a discharge operation signal sent at a timing at which the article supply device discharges the article. The falling time detector further calculates a time from a point in time at which the signal receiver receives the discharge operation signal to a point in time at which the article dropped and supplied from the article supply device falls to the height position of the lateral sealing mechanism.

With the bag making and packaging machine according to the seventh aspect of the present invention, the time from when the article supply device discharges the article to when the article arrives at the height position of the lateral sealing mechanism is calculated. Since this time is used, the operation timing of the lateral sealing mechanism and the discharge timing of the article can be accurately adjusted.

A bag making and packaging machine according to an eighth aspect of the present invention is the bag making and packaging machine according to any of the first to seventh aspects, further includes a signal transmitter. The signal transmitter sends a discharge request signal to the article supply device for requesting a discharge of the article.

With the bag making and packaging machine according to the eighth aspect of the present invention, it is possible to accurately adjust the discharge timing of the article based on the detection result that the article has fallen to the height position of the lateral sealing mechanism.

With the bag making and packaging machine according to certain implementations, it is possible to detect that the article has fallen to the height position of the lateral sealing mechanism without additionally providing a sensor. As such, it is possible to accurately detect that the article has fallen to the height position of the lateral sealing mechanism while suppressing the cost of the machine.

BRIEF DESCRIPTION OF THE DRAWINGS

FIG. 2 is a perspective view illustrating a schematic configuration of a bag making and packaging unit of the bag making and packaging machine illustrated in FIG. 1;

FIG. 5A is a schematic side view of a sealing member of the lateral sealing mechanism of the bag making and packaging unit illustrated in FIG. 2, wherein a state is illustrated in which a pair of sealing members are separated from each other and shutters of the sealing members are open;

FIG. 5B is a schematic side view of the sealing members of the lateral sealing mechanism of the bag making and packaging unit illustrated in FIG. 2, wherein a state is illustrated in which the pair of sealing members have approached each other, and the shutters of the sealing members are closed;

FIG. 9 is a drawing for explaining a movement trajectory of the sealing members according to Modification Example C performing a D motion operation, wherein the movement trajectory of the sealing members is depicted as seen from the right side.

DETAILED DESCRIPTION

Hereinafter a bag making and packaging machine according to an embodiment of the present invention will be described with reference to the drawings. Note that the following embodiments are merely examples of the present invention and should not be construed as limiting the technical scope of the present invention.

(1) OVERALL CONFIGURATION

Figure 1:
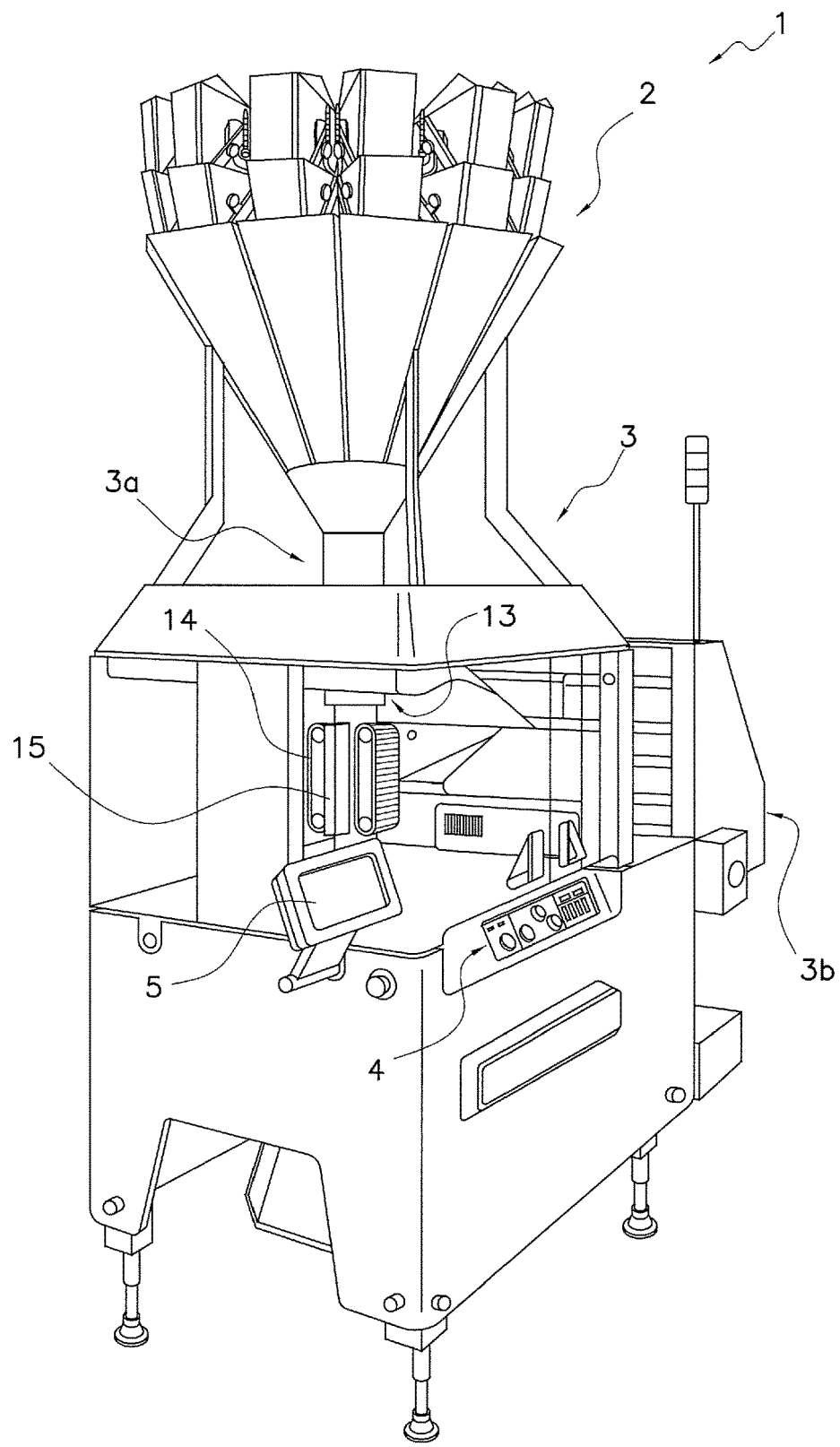
FIG. 1 is a perspective view of a weighing and packaging apparatus including a bag making and packaging machine according to an embodiment of the present invention.

FIG. 1 is a perspective view of a weighing and packaging apparatus 1 including a bag making and packaging machine 3 according to an embodiment of a packaging machine of the present invention.

The weighing and packaging apparatus 1 mainly includes a combination weighing machine 2 and the bag making and packaging machine 3 (see FIG. 1).

The combination weighing machine 2 is an example of the article supply device. The combination weighing machine 2 is disposed above a bag making and packaging unit 3a (see FIG. 1). In the combination weighing machine 2, the weights of articles C (objects to be packaged) are weighed in a plurality of weighing hoppers, the weight values are combined so as to amount to a predetermined total weight, and the combined articles C of the predetermined total weight are discharged downward.

The bag making and packaging machine 3 receives the articles C dropped and supplied from the combination weighing machine 2 disposed above the bag making and packaging machine 3, and packages the articles in a bag B to be made (see FIG. 2). The bag making and packaging machine 3 includes the bag making and packaging unit 3a, a film supplying unit 3b, and a controller 90 (see FIGS. 1 and 6).

The bag making and packaging unit 3a bags the articles C in time with the timing at which the articles C are supplied from the combination weighing machine 2 (see FIG. 2).

The film supplying unit 3b supplies packaging film F, which turns into the bag B, to the bag making and packaging unit 3a.

The weighing and packaging apparatus 1 has an operation panel 4 and a touch panel-type display 5. The operation panel 4 is an operation panel for operating the weighing and packaging apparatus 1, and mainly includes switches. The display 5 displays the operating state of the weighing and packaging apparatus 1, and receives input of various settings and the like for the weighing and packaging apparatus 1. The operation panel 4 and the display 5 function as input units that receive commands for the combination weighing machine 2 and the bag making and packaging machine 3 and settings related to the combination weighing machine 2 and the bag making and packaging machine 3. Additionally, the display 5 functions as an output unit that displays information related to the combination weighing machine 2 and the bag making and packaging machine 3. In this embodiment, the operation panel 4 and the display 5 are shared by the combination weighing machine 2 and the bag making and packaging machine 3, but this configuration should not be construed as the limitation. An operation panel and a display may be provided to each of the combination weighing machine 2 and the bag making and packaging machine 3.

The operation panel 4 and the display 5 are connected to a controller (not illustrated in the drawings) of the combination weighing machine 2 and the controller 90 of the bag making and packaging machine 3. The controller of the combination weighing machine 2 controls the combination weighing machine 2 in accordance with the operations and settings inputted via the operation panel 4 and the display 5. The controller 90 of the bag making and packaging machine 3 controls the bag making and packaging machine 3 in accordance with the operations and settings inputted via the operation panel 4 and the display 5. The controller (not illustrated in the drawings) of the combination weighing machine 2 and the controller 90 of the bag making and packaging machine 3 are electrically connected to each other (see FIG. 6). The controller 90 controls the bag making and packaging machine 3 based on the operations and settings inputted via the operation panel 4 and the display 5, detection results of various sensors installed in the bag making and packaging machine 3, signals sent from the controller of the combination weighing machine 2, and the like.

In this embodiment, the controller of the combination weighing machine 2 and the controller 90 of the bag making and packaging machine 3 are separate devices. However, this configuration is not limiting and both the combination weighing machine 2 and the bag making and packaging machine 3 may be controlled by a single controller.

(2) DETAILED CONFIGURATION

Next, the bag making and packaging machine 3 will be described in detail.

Note that, in the following description, there are cases in which expressions such as "front (front face)", "back (back face)", "top", "bottom", "left", and "right" are used for indicating the direction. Unless otherwise noted, these expressions are used according to the arrows depicted in FIGS. 2 to 4, 5A, and 5B. Also, in the following description, there are cases in which the expressions "upstream" and "downstream" are used. Unless otherwise noted, the expressions "upstream" and "downstream" are used according to the transportation direction of the film F.

(2-1) Bag Making and Packaging Unit

Next, the bag making and packaging unit 3a of the bag making and packaging machine 3 will be described.

Figure 6:
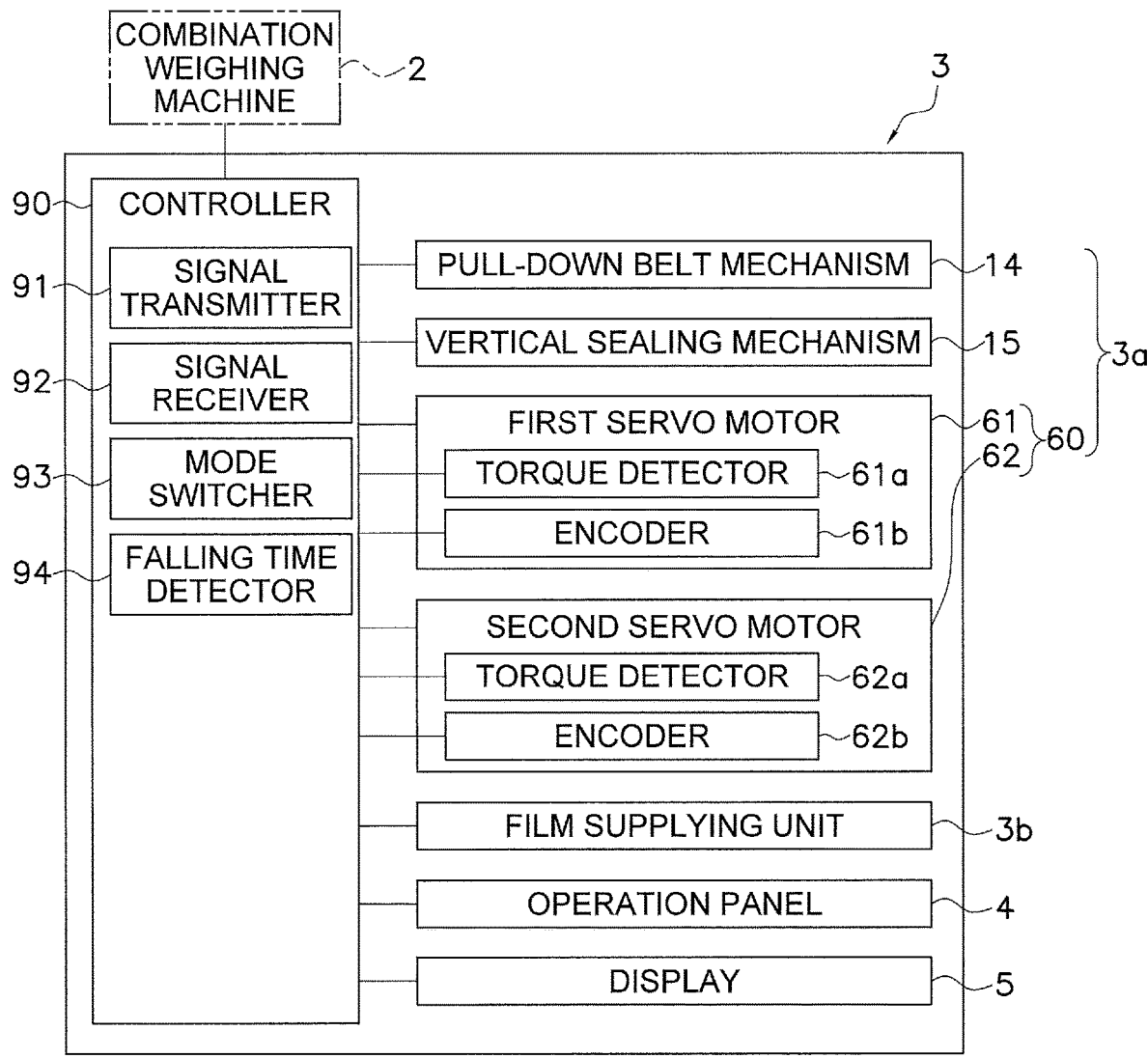
FIG. 6 is a block diagram of the bag making and packaging machine illustrated in FIG. 1.

The bag making and packaging unit 3a mainly includes a forming mechanism 13, a pull-down belt mechanism 14, a vertical sealing mechanism 15, a lateral sealing mechanism 20, and a servo motor 60 (see FIGS. 2 and 6).

The forming mechanism 13 forms the sheet film F transported from the film supplying unit 3b into a cylindrical shape. The pull-down belt mechanism 14 transports the cylindrically shaped film F (hereinafter referred to as "cylindrical film Fc") downward. The vertical sealing mechanism 15 seals an overlapping portion (seam) of the cylindrical film Fc in the vertical direction. The lateral sealing mechanism 20 is disposed below the pull-down belt mechanism 14 and the vertical sealing mechanism 15. The lateral sealing mechanism 20 is driven by the servo motor 60, and seals (laterally seals) the cylindrical film Fc, transported downward, in a direction that crosses the transportation direction, thus sealing top and bottom edges of the bag B. Additionally, the lateral sealing mechanism 20 cuts the laterally sealed bag B away from the cylindrical film Fc. The packaged bag B that has been cut away from the cylindrical film Fc is discharged below the bag making and packaging machine 3.

(2-1-1) Forming Mechanism

The forming mechanism 13 includes a tube 13b and a former 13a (see FIG. 2).

The tube 13b is a member with a cylindrical shape and top and bottom ends thereof are open. The articles C that were weighed by the combination weighing machine 2 are put into the opening in the top end of the tube 13b.

The former 13a is disposed so as to surround the tube 13b. The sheet film F, supplied from a film roll of the film supplying unit 3b, is passed between the former 13a and the tube 13b, thereby being formed into a cylindrical shape. The tube 13b and the former 13a of the forming mechanism 13 are configured to be replaceable depending on the size and the like of the bag B to be produced.

(2-1-2) Pull-Down Belt Mechanism

The pull-down belt mechanism 14 continuously transports the cylindrical film Fc wound around the tube 13b downward while adhering the cylindrical film Fc. As illustrated in FIG. 2, the pull-down belt mechanism 14 includes a pair of belts 14c disposed to the left and right of the tube 13b so as to sandwich the tube 13b. The belts 14c have adhesion functions. Each of the pair of belts 14c is wound around a drive roller 14a and a driven roller 14b. The drive rollers 14a are driven by a drive motor (not illustrated in the drawings) to transport the cylindrical film Fc adhered to the belts 14c downward.

(2-1-3) Vertical Sealing Mechanism

Figure 3:
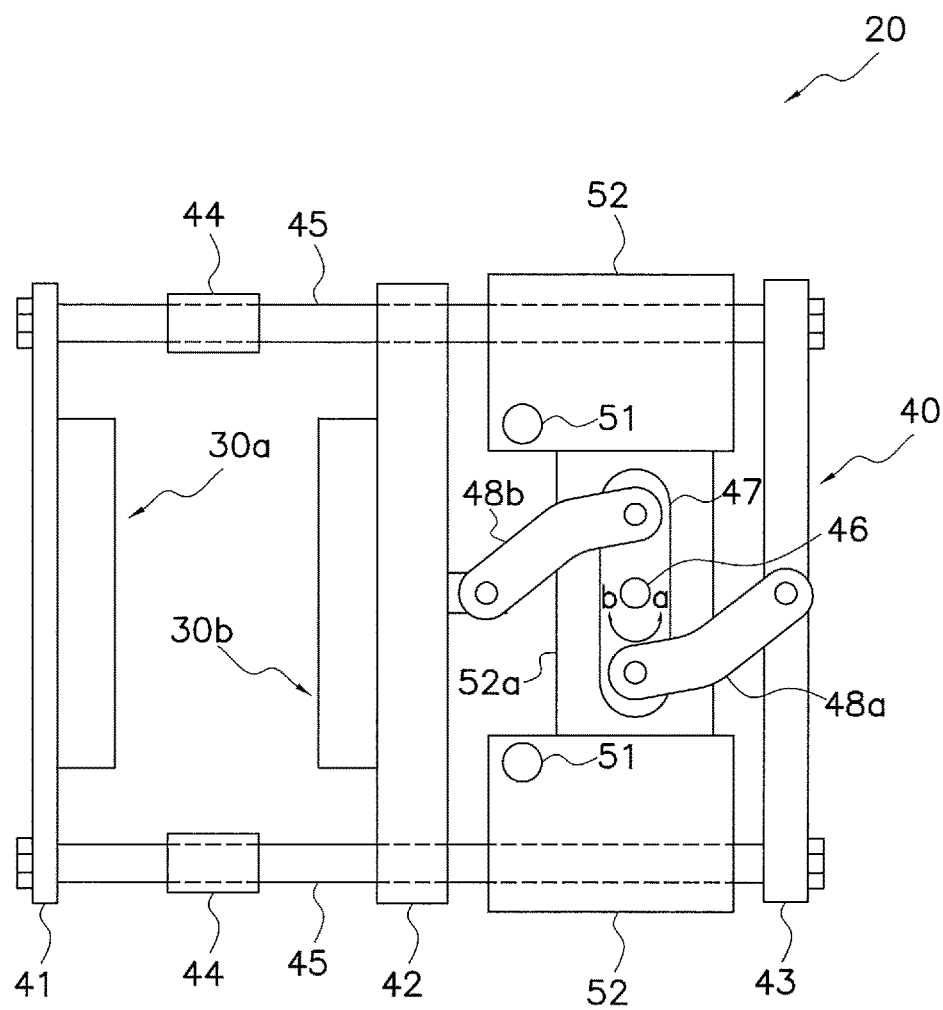
FIG. 3 is a schematic plan view of a horizontal movement mechanism of a lateral sealing mechanism of the bag making and packaging unit illustrated in FIG. 2.

The vertical sealing mechanism 15 heat-seals the cylindrical film Fc in the vertical direction (the up-down direction in FIG. 3).

The vertical sealing mechanism 15 is disposed in front of the tube 13b (see FIG. 3). The vertical sealing mechanism 15 is driven in the front-back direction by a drive mechanism (not illustrated in the drawings) so as to move toward the tube 13b or move away from the tube 13b. When the driving mechanism drives the vertical sealing mechanism 15 so as to move toward the tube 13b, the overlapping portion (seam) of the cylindrical film Fc wound around the tube 13b is sandwiched between the vertical sealing mechanism 15 and the tube 13b. The vertical sealing mechanism 15 heat-seals the cylindrical film Fc in the vertical direction by heating the overlapping portion of the cylindrical film Fc while sandwiching it between the vertical sealing mechanism 15 and the tube 13b.

(2-1-4) Lateral Sealing Mechanism

The lateral sealing mechanism 20 is a mechanism that laterally seals the cylindrical film Fc that has been formed into the cylindrical shape. Specifically, the lateral sealing mechanism 20 sandwiches the cylindrical film Fc, formed into the cylindrical shape by the forming mechanism 13 and sealed in the vertical direction by the vertical sealing mechanism 15, with a pair of sealing jaws 31a and 31b (described later, see FIG. 5A) extending in a direction (the left-right direction in this case) crossing the transportation direction of the cylindrical film Fc, and heat-seals the cylindrical film Fc.

The lateral sealing mechanism 20 includes a pair of sealing members 30a and 30b (see FIG. 5A). Additionally, the lateral sealing mechanism 20 includes a horizontal movement mechanism 40 and a vertical movement mechanism 50 (see FIGS. 3 and 4). The horizontal movement mechanism 40 moves the sealing members 30a and 30b in the horizontal direction. The horizontal movement mechanism 40 moves the sealing members 30a and 30b in the front-back direction. The vertical movement mechanism 50 moves the sealing members 30a and 30b in the vertical direction.

Hereinafter, the sealing members 30a and 30b, the horizontal movement mechanism 40, and the vertical movement mechanism 50 are described while referencing the drawings.

Figure 4:
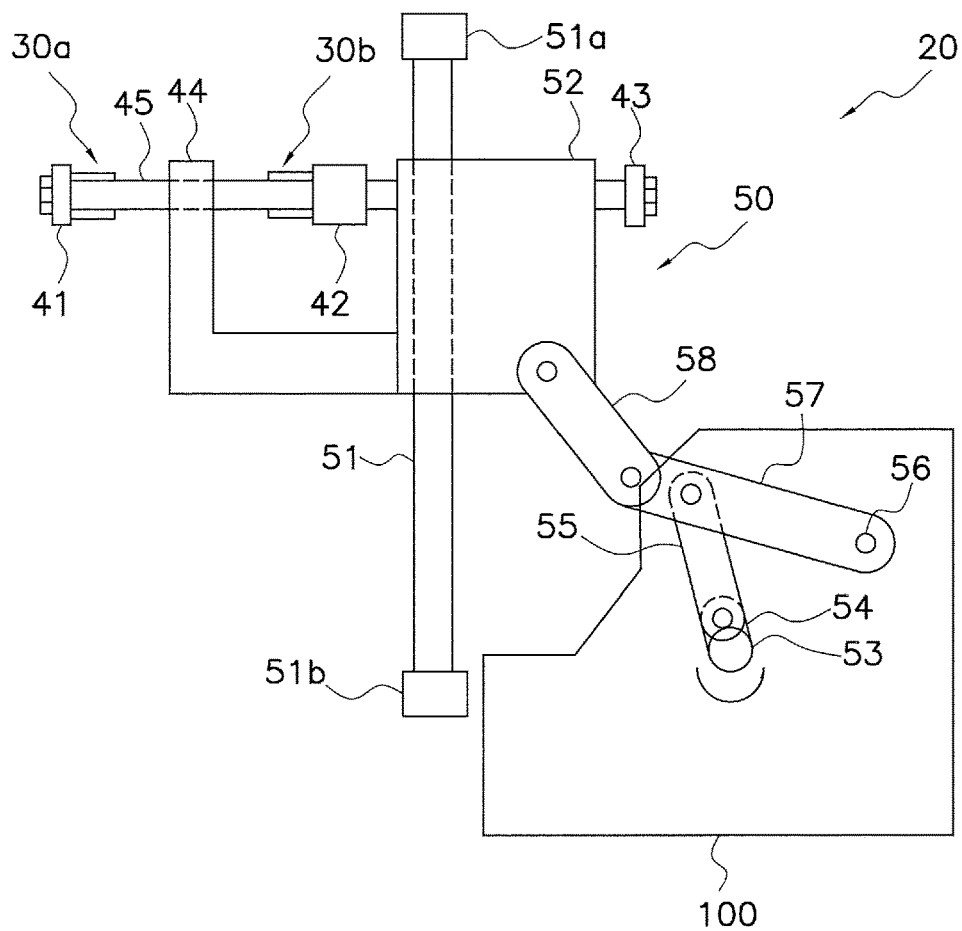
FIG. 4 is a schematic side view of a vertical movement mechanism of the lateral sealing mechanism of the bag making and packaging unit illustrated in FIG. 2, wherein a rotating shaft, a crank, and links of the horizontal movement mechanism of the lateral sealing mechanism are not illustrated.

FIG. 3 is a plan view of the horizontal movement mechanism 40. FIG. 4 is a side view of the vertical movement mechanism 50, as viewed from the right side. FIG. 5 is a side view of the sealing members 30a and 30b, as viewed from the right side.

(2-1-4-1) Sealing Members

The sealing member 30a is disposed in front of the cylindrical film Fc transported by the pull-down belt mechanism 14 (see FIG. 3). The sealing member 30b is disposed behind the cylindrical film Fc transported by the pull-down belt mechanism 14, so as to face the sealing member 30a (see FIG. 3). The sealing members 30a and 30b are moved by the horizontal movement mechanism 40 so as to approach/separate from each other. FIG. 5A illustrates a state in which the sealing members 30a and 30b are separated from each other. FIG. 5B illustrates a state in which the sealing members 30a and 30b have approached each other. Additionally, the sealing members 30a and 30b are moved in the up-down direction by the vertical movement mechanism 50.

The sealing member 30a mainly includes a base 41, a sealing jaw 31a, a shutter 32a, and a squeezing member 33a (see FIG. 5A). The sealing member 30b mainly includes a base 42, a sealing jaw 31b, a shutter 32b, and a squeezing member 33b (see FIG. 5A).

The bases 41 and 42 are plate-like members that extend in the left-right direction (see FIG. 3). The sealing jaw 31a, the shutter 32a, and the squeezing member 33a are attached to a back face of the base 41 (see FIG. 5A). The sealing jaw 31b, the shutter 32b, and the squeezing member 33b are attached to a front face of the base 42 (see FIG. 5A). The sealing jaw 31a and the sealing jaw 31b are respectively attached to the base 41 and the base 42 so as to face each other. The shutter 32a and the shutter 32b are respectively attached to the base 41 and the base 42 so as to face each other. The squeezing member 33a and the squeezing member 33b are respectively attached to the base 41 and the base 42 so as to face each other.

Two support rods 45 (described later) of the horizontal movement mechanism 40 are connected to the base 41. Specifically, one of the support rods 45 is connected in the vicinity of the left end of the base 41 and the other of the support rods 45 is connected in the vicinity of the right end of the base 41 (see FIG. 3). The support rods 45 are rod-like members that extend horizontal to the front-back direction. Holes extending in the front-back direction are formed in the base 42, in the vicinities of the left and right ends of the base 42, and one of the support rods 45 is inserted through one of these holes (see FIG. 3). The base 42 slidably engages with the support rods 45. As described later, the bases 41 and 42 are moved by the horizontal movement mechanism 40 so as to approach/separate from each other. Additionally, the bases 41 and 42 are moved in the up-down direction at the same time by moving support blocks 52 (described later), into which the support rods 45 are inserted, in the up-down direction with the vertical movement mechanism 50.

The sealing jaws 31a and 31b are members that form a pair and sandwich and heat-seal the cylindrical film Fc. The sealing jaws 31a and 31b extend in a direction crossing the transportation direction of the cylindrical film Fc. Here, this direction is the left-right direction. The sealing jaws 31a and 31b extend longer in the left-right direction than a width of the cylindrical film Fc in the left-right direction. The sealing jaws 31a and 31b are respectively attached to the bases 41 and 42. Each of the sealing jaws 31a and 31b contains a heater (not illustrated in the drawings) therein. The cylindrical film Fc is disposed between the sealing jaw 31a and the sealing jaw 31b. At a predetermined timing, the sealing jaws 31a and 31b that have been heated by the heaters are moved so as to approach each other by the horizontal movement mechanism 40. The cylindrical film Fc is heat-sealed as a result of being sandwiched between the back face of the sealing jaw 31a and the front face of the sealing jaw 31b.

A groove 34 extending in the left-right direction is formed in a central portion in the up-down direction on the front side of the sealing jaw 31b. The groove 34 houses a cutter 36. The cutter 36 extends in the left-right direction. After the cylindrical film Fc has been laterally sealed by the sealing jaws 31a and 31b, the cutter 36 is driven by a drive mechanism (e.g. an air cylinder, not illustrated in the drawings) so as to move forward (toward the sealing jaw 31a). The cutter 36 that moves forward enters into a groove 35 formed so as to extend in the left-right direction in a central portion in the up-down direction on the back side of the sealing jaw 31a. The groove 35 is opposite to the groove 34. When the cutter 36 is driven so as to enter into the groove 35, the cylindrical film Fc in which the top and bottom edges have been laterally sealed (that is, the bag B), is cut away from the cylindrical film Fc on the upstream side. The packaged bag B is discharged below the bag making and packaging machine 3. Note that, in this case, the cutter 36 is provided on the sealing jaw 31b side, but this configuration should not be construed as the limitation. Alternatively, the cutter 36 may be provided on the sealing jaw 31a side.

The shutters 32a and 32b are members that form a pair and sandwich the cylindrical film Fc to prevent debris, fine powder, and the like of the articles C from falling.

The shutters 32a and 32b are respectively disposed above the sealing jaws 31a and 31b. The shutters 32a and 32b are respectively disposed adjacent to the sealing jaws 31a and 31b. When the cylindrical film Fc is being laterally sealed by the sealing jaws 31a and 31b, the shutters 32a and 32b reduce the possibility that debris, fine powder, and the like of the articles C, which have fallen late, enter the portion of the cylindrical film Fc to be laterally sealed.

The shutters 32a and 32b are plate-like members. The shutters 32a and 32b extend in the direction crossing the transportation direction of the cylindrical film Fc. Here, this direction is the left-right direction. That is, the shutters 32a and 32b extend parallel to the sealing jaws 31a and 31b. The shutters 32a and 32b extend longer in the left-right direction than the width of the cylindrical film Fc in the left-right direction. The shutters 32a and 32b are respectively attached to the bases 41 and 42. The shutter 32a is biased backward by an elastic member (spring or the like, not illustrated in the drawings). The shutter 32b is biased forward by an elastic member (spring or the like, not illustrated in the drawings). When the sealing jaws 31a and 31b laterally seal the cylindrical film Fc, the bases 41 and 42 to which the sealing jaws 31a and 31b are attached move so as to approach each other, and the shutters 32a and 32b thereby sandwich the cylindrical film Fc before the sealing jaws 31a and 31b sandwich the cylindrical film Fc. In other words, when the sealing jaws 31a and 31b laterally seal the cylindrical film Fc, the bases 41 and 42 to which the sealing jaws 31a and 31b are attached move so as to approach each other, and the shutters 32a and 32b thereby close before the sealing jaws 31a and 31b sandwich the cylindrical film Fc. As a result, the possibility is reduced that the debris and the like of the articles C fall into the portion of the cylindrical film Fc to be laterally sealed by the sealing jaws 31a and 31b.

Stroking members 33a and 33b are plate-like members. The stroking members 33a and 33b form a pair, stroke the cylindrical film Fc, and cause the debris, fine powder, and the like of the articles C adhered to the inner surface of the cylindrical film Fc to fall.

The stroking members 33a and 33b are respectively disposed below the sealing jaws 31a and 31b. The stroking members 33a and 33b are respectively disposed adjacent to the sealing jaws 31a and 31b. The stroking members 33a and 33b are moved downward by the vertical movement mechanism 50 while sandwiching the cylindrical film Fc. As a result, the stroking members 33a and 33b cause the debris, fine powder, and the like of the articles adhered to the inner surface of the cylindrical film Fc to fall, thereby reducing the possibility that the debris and the like of the articles C enter the portion of the cylindrical film Fc to be laterally sealed by the sealing jaws 31a and 31b.

The stroking members 33a and 33b are members that extend in the direction crossing the transportation direction of the cylindrical film Fc. Here, this direction is the left-right direction. That is, the stroking members 33a and 33b extend parallel to the sealing jaws 31a and 31b. The stroking members 33a and 33b extend longer in the left-right direction than the width of the cylindrical film Fc in the left-right direction. The stroking members 33a and 33b are respectively attached to the bases 41 and 42. The stroking member 33a is biased backward by an elastic member (spring or the like, not illustrated in the drawings). The stroking member 33b is biased forward by an elastic member (spring or the like, not illustrated in the drawings). When the sealing jaws 31a and 31b laterally seal the cylindrical film Fc, the bases 41 and 42 to which the sealing jaws 31a and 31b are attached move so as to approach each other, and the stroking members 33a and 33b thereby sandwich the cylindrical film Fc before the sealing jaws 31a and 31b sandwich the cylindrical film Fc. When the bases 41 and 42 to which the stroking members 33a and 33b are fixed are moved downward by the vertical movement mechanism 50 while in this state, the stroking members 33a and 33b cause the debris and the like of the articles C adhered to the inner surface of the cylindrical film Fc to fall. As a result, the possibility is reduced that the debris and the like of the articles C enter the portion of the cylindrical film Fc to be laterally sealed by the sealing jaws 31a and 31b.

(2-1-4-2) Horizontal Movement Mechanism

The horizontal movement mechanism 40 is a mechanism that moves the sealing members 30a and 30b in the horizontal direction. The horizontal movement mechanism 40 moves the sealing members 30a and 30b in the front-back direction.

The horizontal movement mechanism 40 mainly includes the pair of support rods 45, a connecting base 43, a pair of support arms 44, a pair of support blocks 52, a rotating shaft 46, a crank 47, and links 48a and 48b (see FIG. 3).

The support rods 45 are rod-like members that extend horizontal to the front-back direction. Front ends of the pair of support rods 45 are each connected to the base 41 of the sealing member 30a, in the vicinities of the left and right ends of the base 41 (see FIG. 3). Back ends of the pair of support rods 45 are each connected to the connecting base 43, in the vicinities of the left and right ends of the connecting base 43 (see FIG. 3). The connecting base 43 is a plate-like member that extends in the left-right direction. When viewed from above, the base 41, the support rods 45, and the connecting base 43 are disposed in a rectangular frame shape (see FIG. 3).

The support rods 45 are supported by the support blocks 52. Specifically, a hole (not illustrated in the drawings) extending horizontal to the front-back direction is formed in each of the support blocks 52, and one of the pair of the support rods 45 is inserted through one of these holes (see FIG. 3). Each of the support blocks 52 slidably supports the support rod 45 inserted through the hole.

One support arm of the pair of support arms 44 is attached to each of the support blocks 52 (see FIG. 4). Each of the support rods 45 is supported by the support arm 44, which extends forward from the support block 52. As a result, the horizontal posture of the support rods 45 is maintained. The base 42 slidably engages with the support rods 45 between the support arms 44 and the support blocks 52 (see FIG. 3).

The sealing members 30a and 30b are reciprocated backward and forward by a crank mechanism, as specifically described below.

As illustrated in FIG. 3, an upper end of the rotating shaft 46 protrudes upward from an upper surface of a connection frame 52a mounted between the pair of support blocks 52. The rotating shaft 46 is a shaft that is driven and rotated by a second servo motor 62 (described later). The rotating shaft 46 extends in the vertical direction. A lower side of the rotating shaft 46 is rotatably supported by a bearing (not illustrated in the drawings). The crank 47 is engaged with the upper side end of the rotating shaft 46 that protrudes from the upper surface of the connection frame 52a. As illustrated in FIG. 3, the link 48a for the sealing member 30a disposed on the front side is provided between one rotating end (end on the rim side) of the crank 47 and the connecting base 43. The link 48b for the sealing member 30b is provided between the other rotating end (end on the rim side) of the crank 47 and the sealing member 30b disposed on the back side. The lower end of the rotating shaft 46 is connected to the output shaft of the second servo motor 62 so that motive power of the output shaft of the second servo motor 62 of the servo motor 60 (described later) can be transmitted. In one example, the lower end of the rotating shaft 46 and the output shaft of the second servo motor 62 are coupled by a timing pulley and a timing belt, thereby enabling the transmission of motive power.

When the rotating shaft is rotated in a direction shown with the arrow "a" in a state in which the sealing members 30a and 30b are separated from each other, the crank 47 rotates integrally with the rotating shaft in the same direction (the direction of the arrow "a"), and that rotation is converted to linear motion in the front-back direction by the links 48a and 48b. The link 48a, for the sealing member 30a on the front side, presses the connecting base 43 backward, thereby moving the entire frame structure including the connecting base 43, the left and right pair of support rods 45, and the base 41 backward, and horizontally moving the sealing member 30a on the front side backward. Meanwhile, the link 48b, for the sealing member 30b on the back side, presses the connecting base 42 forward, thereby horizontally moving the sealing member 30b on the back side forward.

The distances from the rotational center of the crank 47 to the connection points of each of the links 48a and 48b are the same and the shapes of the links 48a and 48b are the same. Therefore, the pair of front and back sealing members 30a and 30b move the same distance in mutually opposite directions at the same time due to the rotation of the single rotating shaft 46. This results in the sealing jaws 31a and 31b of the sealing members 30a and 30b approaching each other, sandwiching the cylindrical film Fc therebetween, and laterally sealing the cylindrical film Fc by heat and pressure.

When the rotating shaft 46 is rotated in the direction of the arrow "b" in a state in which the sealing jaws 31a and 31b are sandwiching the cylindrical film Fc, the sealing member 30a on the front side conversely horizontally moves forward and, simultaneously, the sealing member 30b horizontally moves backward the same distance. As a result, the sealing members 30a and 30b separate from each other.

(2-1-4-3) Vertical Movement Mechanism

The vertical movement mechanism 50 is a mechanism that moves the sealing members 30a and 30b in the vertical direction.

The vertical movement mechanism 50 mainly includes a pair of guide rods 51, a crank shaft 53, a pair of first intermediate links 55, a pair of swing links 57, and a pair of second intermediate links 58 (see FIG. 4).

The guide rods 51 are rod-like members that extend in the up-down direction. The upper end of each of the guide rods 51 is fixed to an attachment block 51a fixed to the frame (not illustrated in the drawings) of the bag making and packaging machine 3. The lower end of each of the guide rods 51 is fixed to an attachment block 51b fixed to the frame (not illustrated in the drawings) of the bag making and packaging machine 3. The guide rods 51 extend in the vertical direction. That is, the guide rods 51 extend parallel to the rotating shaft 46. Each of the pair of guide rods 51 vertically penetrates one of the support blocks 52. The support blocks 52 move in the up-down direction along the guide rods 51.

The support blocks 52 are reciprocated up and down along the pair of guide rods 51 and the rotating shaft 46 by a crank-link mechanism, as specifically described below.

In the bag making and packaging machine 3, a pair of left and right vertical walls 100 are erected that extend upward from the lower-side frame (not illustrated in the drawings) of the bag making and packaging machine 3. The crank shaft 53, which extends in the left-right direction, is rotatably mounted between the vertical walls 100. A crank arm 54 is attached to each of the left and right ends of the crank shaft 53. One end of each of the first intermediate links 55 is connected to the rotating end of each of the crank arms 54. The other end of each of the first intermediate links 55 is connected to an intermediate position in the length direction of each of the swing links 57. Additionally, a shaft 56 for a swing fulcrum is rotatably mounted between the vertical walls 100. One end of the each of the swing links 57 is connected to each end of the shaft 56 for the swing fulcrum (see FIG. 4). Each of the support blocks 52 is coupled to the swing end of each of the swing links 57 via each of the second intermediate links 58.

The crank shaft 53 is connected to the output shaft of the first servo motor 61 so that motive power of the output shaft (not illustrated in the drawings) of the first servo motor 61 of the servo motor 60 (described later) can be transmitted. In one example, the crank shaft 53 and the output shaft of the first servo motor 61 are connected with a timing pulley and a timing belt, thereby enabling the transmission of motive power. When the first servo motor 61 is driven and the crank shaft 53 thereby rotates, the first intermediate links 55 move up and down and the swing links 57 are swung up and down due to the rotation of the crank arms 54. The swing links 57 cause the support blocks 52 and, in turn, the horizontal movement mechanism 40, to reciprocate up and down while the second intermediate links 58 absorb the torsion between arc motion and linear motion. As a result, the sealing members 30a and 30b attached to the support rods 45 of the horizontal movement mechanism 40 reciprocate up and down.

(2-1-5) Servo Motor

The servo motor 60 is a motor that drives the lateral sealing mechanism 20. The servo motor 60 includes the first servo motor 61 and the second servo motor 62.

(2-1-5-1) First Servo Motor

The first servo motor 61 drives the vertical movement mechanism 50 of the lateral sealing mechanism 20 and drives the sealing members 30a and 30b in the vertical direction. Specifically, the first servo motor 61 moves, in the up-down direction, the sealing jaw 31a, the shutter 32a, and the stroking member 33a of the sealing member 30a and the sealing jaw 31b, the shutter 32b, and the stroking member 33b of the sealing member 30b. While the bag making and packaging machine 3 is in operation, the vertical movement mechanism 50 drives the shutter 32a and the shutter 32b downward while the shutters 32a and 32b are closed and the shutters 32a and 32b are present in the passage through which the articles C dropped and supplied from the combination weighing machine 2 pass. That is, the first servo motor 61 drives the shutters 32a and 32b in the vertical direction within the passage through which the articles C dropped and supplied from the combination weighing machine 2 pass.

The first servo motor 61 includes a torque detector 61a and an encoder 61b. The torque detector 61a detects torque acting on the output shaft (not illustrated in the drawings) of the first servo motor 61. The torque detector 61a detects the torque acting on the output shaft at, for example, 0.5 millisecond intervals. Detection results of the torque detector 61a are outputted to the controller 90 as information related to the torque of the first servo motor 61. Note that the information related to the torque may be the value of the torque itself or may be a value that changes in accordance with the value of the torque. The encoder 61b detects an axial rotation amount of the output shaft (not illustrated in the drawings) of the first servo motor 61. Detection results of the encoder 61b are outputted to the controller 90 as information related to the axial rotation amount of the first servo motor 61. Note that the information related to the axial rotation amount may be the value of the axial rotation amount itself or may be a value that changes in accordance with the value of the axial rotation amount.

(2-1-5-2) Second Servo Motor

The second servo motor 62 drives the horizontal movement mechanism 40 of the lateral sealing mechanism 20 and drives the sealing members 30a and 30b in the horizontal direction. Specifically, the second servo motor 62 moves the sealing jaw 31a, the shutter 32a, and the stroking member 33a of the sealing member 30a and the sealing jaw 31b, the shutter 32b, and the stroking member 33b of the sealing member 30b that respectively correspond to the sealing jaw 31a, the shutter 32a, and the stroking member 33a so as to approach each other or separate from each other. The second servo motor 62 moves the pair of sealing jaws 31a and 31b so as to approach each other and, as a result, the pair of sealing jaws 31a and 31b enters the passage through which the articles C dropped and supplied from the combination weighing machine 2 pass. Additionally, the second servo motor 62 moves the pair of shutters 32a and 32b so as to approach each other and, as a result, the pair of shutters 32a and 32b enters the passage through which the articles C dropped and supplied from the combination weighing machine 2 pass. That is, the second servo motor 62 drives the sealing jaws 31a and 31b and the shutters 32a and 32b in the horizontal direction within the passage through which the articles C dropped and supplied from the combination weighing machine 2 pass.

The second servo motor 62 includes a torque detector 62a and an encoder 62b. The torque detector 62a detects torque acting on the output shaft (not illustrated in the drawings) of the second servo motor 62. The torque detector 62a detects the torque acting on the output shaft at, for example, 0.5 millisecond intervals. Detection results of the torque detector 62a are outputted to the controller 90 as information related to the torque of the second servo motor 62. Note that the information related to the torque may be the value of the torque itself or may be a value that changes in accordance with the value of the torque. The encoder 62b detects an axial rotation amount of the output shaft (not illustrated in the drawings) of the second servo motor 62. Detection results of the encoder 62b are outputted to the controller 90 as information related to the axial rotation amount of the second servo motor 62. Note that the information related to the axial rotation amount may be the value of the axial rotation amount itself or may be a value that changes in accordance with the value of the axial rotation amount.

(2-1-6) Controller

The controller 90 is mainly configured from a CPU and a storage unit including ROM, RAM, or the like. The controller 90 is electrically connected to each component of the bag making and packaging machine 3. Specifically, the controller 90 is electrically connected to the pull-down belt mechanism 14, the vertical sealing mechanism 15, the servo motor 60 (the first servo motor 61 and the second servo motor 62), and the film supplying unit 3b (see FIG. 6). Additionally, the controller 90 is electrically connected to the operation panel 4 and the touch panel-type display 5 (see FIG. 6). Moreover, the controller 90 is electrically connected to the controller (not illustrated in the drawings) of the combination weighing machine 2 (see FIG. 6). The controller 90 controls the operations of the bag making and packaging machine 3 by executing a program stored in the storage unit. The control of the operations of the bag making and packaging machine 3 by the controller 90 is described later.

The controller 90 includes, as functional components, a signal transmitter 91, a signal receiver 92, a mode switcher 93, and a falling time detector 94.

(2-1-6-1) Signal Transmitter

The signal transmitter 91 is a functional component that enables the sending of signals to the controller of the combination weighing machine 2. In one example, the signal transmitter 91 is configured to be capable of sending, to the controller of the combination weighing machine 2, a discharge request signal for requesting discharge of the articles C. The controller 90 causes the signal transmitter 91 to send a discharge request signal to the controller of the combination weighing machine 2 at an appropriate timing so that the articles C to be packaged are inserted into the bag B to be made by the bag making and packaging machine 3, and processing capacity ordered by an operator via the operation panel 4 or the display 5 can be achieved. The sending timing of the discharge request signal from the signal transmitter 91 may, for example, be adjusted based on a falling time of the articles C calculated by the falling time detector 94 (described later).

(2-1-6-2) Signal Receiver

The signal receiver 92 is a functional component that enables the receipt of signals from the controller of the combination weighing machine 2. In one example, the signal receiver 92 receives the discharge operation signal sent at the timing at which the combination weighing machine 2 discharges the articles C. The discharge operation signal is, for example, sent from the controller of the combination weighing machine 2. Alternatively, it may be configured that a sensor (e.g. a photoelectric sensor) is provided directly below the discharge outlet of the articles C in the combination weighing machine 2, and the discharge operation signal is sent from the sensor at a timing at which the articles C are detected.

The discharge operation signal is used, for example, by the falling time detector 94 to calculate the falling time of the articles C. The term "falling time of the articles C" refers to a time from a point in time at which the signal receiver 92 receives the discharge operation signal to a point in time at which the articles C dropped and supplied from the combination weighing machine 2 fall to the height position of the lateral sealing mechanism 20. The term "height position of the lateral sealing mechanism 20" refers to the height position of the sealing members 30a and 30b of the lateral sealing mechanism 20 in a state where the sealing members 30a and 30b are positioned at a predetermined height (in this case, at the upper edge) within their moving range in the up-down direction.

In one example, the discharge operation signal may be used to adjust the operation timing of the lateral sealing mechanism 20 so that the articles C to be packaged are inserted into the bag B to be made and processing capacity ordered by the operator via the operation panel 4 or the display 5 can be achieved when the bag making and packaging machine 3 operates in conjunction with the combination weighing machine 2.

(2-1-6-3) Mode Switcher

The mode switcher 93 is configured to be switchable between a falling time detection OFF mode in which the falling time detector 94 (described later) is not operated and a falling time detection ON mode in which the falling time detector 94 (described later) is operated. Note that the falling time detection ON mode includes a first falling time detection mode in which the falling time detector 94 is caused to execute first falling time detection processing and a second falling time detection mode in which the falling time detector 94 is caused to execute second falling time detection processing. The falling time detection OFF mode is an example of the second mode. The first falling time detection mode is an example of the first mode. The second falling time detection mode is an example of the third mode. The first falling time detection processing and the second falling time detection processing will be described later.

In one example, the mode switcher 93 switches the operating mode of the falling time detector 94 when a mode switching command is inputted via the operation panel 4, the display 5, or the like by the operator of the bag making and packaging machine 3. When, for example, adjusting the bag making and packaging machine 3 to package novel articles C into the bag B, the operator of the weighing and packaging apparatus 1 switches the mode of the falling time detector 94 from the falling time detection OFF mode to the first falling time detection mode or the second falling time detection mode. In another example, the mode switcher 93 may be configured that the mode switcher 93 automatically switches the mode of the falling time detector 94 from the falling time detection OFF mode to the first falling time detection mode or the second falling time detection mode, when, for example, information that the type of the articles C is being changed has been inputted via the operation panel 4, the display 5, or the like.

The mode switcher 93 automatically switches the mode of the falling time detector 94 from the first falling time detection mode or the second falling time detection mode to the falling time detection OFF mode when the falling time detector 94 completes the first falling time detection processing or the second falling time detection processing. In another example, the mode switcher 93 may be configured that the mode switcher 93 switches the mode of the falling time detector 94 from the first falling time detection mode or the second falling time detection mode to the falling time detection OFF mode on the basis of an input by the operator via the operation panel 4, the display 5, or the like.

(2-1-6-4) Falling Time Detector

The falling time detector 94 performs the falling time detection processing of the articles C. Specifically, the falling time detector 94 detects that the articles C dropped from the combination weighing machine 2 have fallen to the height position of the lateral sealing mechanism 20 based on the information related to the torque of the servo motor 60 or the information related to the axial rotation amount of the servo motor 60. The term "height position of the lateral sealing mechanism 20" refers to the height position of the sealing members 30a and 30b of the lateral sealing mechanism 20 in a state where the sealing members 30a and 30b are positioned at a predetermined height (in this case, at the upper edge) within their moving ranges in the up-down direction. Additionally, the falling time detector 94 calculates the time (the falling time of the articles C) from the point in time at which the signal receiver 92 receives a discharge operation signal to the point in time at which the articles C dropped and supplied from the combination weighing machine 2 when that discharge operation signal is sent, has fallen to the height position of the lateral sealing mechanism 20.

The falling time detection processing of the articles C by the falling time detector 94 includes the first falling time detection processing and the second falling time detection processing. The first falling time detection processing and the second falling time detection processing have different methods of detecting that the articles C have fallen to the height position of the lateral sealing mechanism 20. With the first falling time detection processing, the falling time detector 94 detects that the articles C dropped from the combination weighing machine 2 have fallen to the height position of the lateral sealing mechanism 20 based on the information related to the torque of the first servo motor 61. With the second falling time detection processing, the falling time detector 94 detects that the articles C dropped from the combination weighing machine 2 have fallen to the height position of the lateral sealing mechanism 20 based on the information related to the axial rotation amount of the second servo motor 62. The first falling time detection processing and the second falling time detection processing will be described in detail later.

(2-2) Film Supplying Unit

The film supplying unit 3b supplies the sheet film F to the forming mechanism 13 of the bag making and packaging unit 3a. The film supplying unit 3b is provided adjacent to the bag making and packaging unit 3a. A roll of film (not illustrated in the drawings) on which the film F is wound is set in the film supplying unit 3b and the film F is fed out from this roll of film.

(3) OPERATIONS OF COMPONENTS OF BAG MAKING AND PACKAGING MACHINE DURING NORMAL OPERATION

Next, the operations of the various components of the bag making and packaging machine 3 during normal operation will be described. The term "normal operation" refers to a state in which the bag making and packaging machine 3 successively produces bags B filled with the articles C supplied from the combination weighing machine 2.

When the weighing and packaging apparatus 1 operates, the controller (not illustrated in the drawings) of the combination weighing machine 2 controls the combination weighing machine 2 so as to measure the weight of the articles C using a plurality of weighing hoppers, combine the weighed values so as to come to a predetermined total weight, and discharge the combined articles C downward.

The controller 90 of the bag making and packaging machine 3 causes the signal transmitter 91 to send the discharge request signal to the controller of the combination weighing machine 2 at a predetermined timing. The controller of the combination weighing machine 2 that has received the discharge request signal causes the articles C, that have been prepared for discharge, to be discharged from the combination weighing machine 2, and drops the articles C into the upper end opening of the tube 13b of the bag making and packaging machine 3. The controller of the combination weighing machine 2 sends the discharge operation signal to the controller 90 of the bag making and packaging machine 3 at the timing at which the combination weighing machine 2 discharges the articles C. The signal receiver 92 receives the discharge operation signal. The controller 90 uses the discharge operation signal received by the signal receiver 92 as a reference to cause each of the components to operate as follows at predetermined timings.

The controller 90 controls the film supplying unit 3b so that the film F is supplied to the forming mechanism 13. Additionally, the controller 90 controls the pull-down belt mechanism 14 so that the film F (the cylindrical film Fc) formed in the cylindrical shape by the forming mechanism 13 is transported downward, and controls the vertical sealing mechanism 15 so that the seam of the transported cylindrical film Fc is sealed in the vertical direction. Moreover, the controller 90 controls the lateral sealing mechanism 20 so that the cylindrical film Fc transported downward is sealed in the lateral direction and the sealed bag B is cut away from the cylindrical film Fc on the upstream side in accordance with the timing at which the articles C discharged from the combination weighing machine 2 are discharged from the lower end opening of the tube 13b.

Next, the sealing operation by the lateral sealing mechanism 20 will be described in detail.

For the convenience of explanation, the operations of the lateral sealing mechanism 20 are described using the point in time at which the operations for the bag B immediately preceding the bag B to be made has been completed as the start point of the operation.

At the point in time of the completion of the lateral sealing operations by the lateral sealing mechanism 20, the sealing members 30a and 30b of the lateral sealing mechanism 20 have been moved, by the vertical movement mechanism 50, to the lower end position in the up-down movement range of the sealing members 30a and 30b. Additionally, the sealing members 30a and 30b have been moved to positions most proximal to each other by the horizontal movement mechanism 40. When the sealing members 30a and 30b are most proximal to each other, the sealing jaw 31a and the sealing jaw 31b are sandwiching the cylindrical film Fc.

First, the horizontal movement mechanism 40 of the lateral sealing mechanism 20 (in other words, the second servo motor 62) moves the sealing members 30a and 30b such that the sealing members 30a and 30b separate from each other. Additionally, the vertical movement mechanism 50 of the lateral sealing mechanism 20 (in other words, the first servo motor 61) moves the sealing members 30a and 30b upward. The vertical movement mechanism 50 moves the sealing members 30a and 30b to the upper end position of the movement range of the sealing members 30a and 30b in the up-down direction.

Next, at a predetermined timing (the timing which is determined so that all of the articles C to be filled have fallen in the cylindrical film Fc that will be made into the next bag B), the horizontal movement mechanism 40 of the lateral sealing mechanism 20 (in other words, the second servo motor 62) moves the sealing members 30a and 30b such that the sealing members 30a and 30b approach each other. Specifically, the horizontal movement mechanism 40 of the lateral sealing mechanism 20 moves the sealing members 30a and 30b to the position where the shutters 32a and 32b and the stroking members 33a and 33b sandwich the cylindrical film Fc. At this point in time, the sealing jaws 31a and 31b do not yet sandwich the cylindrical film Fc. In this state, the vertical movement mechanism 50 of the lateral sealing mechanism 20 (in other words, the first servo motor 61) moves the sealing members 30a and 30b to the lower end position of the movement range in the up-down direction. By closing the shutters 32a and 32b, the possibility can be reduced that the debris and the like of the articles C, which has fallen late, enter into the portion of the cylindrical film Fc to be laterally sealed by the sealing jaws 31a and 31b. Additionally, by moving the stroking members 33a and 33b downward while sandwiching the cylindrical film Fc, the possibility can be reduced that the debris and the like of the articles C, which has adhered to the inside of the cylindrical film Fc, enter into the portion of the cylindrical film Fc to be laterally sealed by the sealing jaws 31a and 31b.

Thereafter, the horizontal movement mechanism 40 of the lateral sealing mechanism 20 (in other words, the second servo motor 62) moves the sealing members 30a and 30b to the position at which the sealing members 30a and 30b are most proximate to each other. At this time, the cylindrical film Fc is sandwiched between the sealing jaw 31a and the sealing jaw 31b, and the cylindrical film Fc is laterally sealed. Then, the cutter 36 is driven at the predetermined timing and, as a result, the bag B filled with the articles C falls and is discharged from the bag making and packaging machine 3.

(4) FALLING TIME DETECTION PROCESSING

Next, the falling time detection processing of the articles C executed by the falling time detector 94 will be described. The falling time detection processing of the articles C is processing that the controller 90 performs to calculate the falling time of the articles C in order to adjust the operation timing and the like of the various components of the bag making and packaging machine 3.

The falling time of the articles C varies depending on the characteristics of the articles C. For example, when the density of the articles C is high (e.g. when the articles C are meatballs or a similar frozen food product) the falling time of the articles C is generally relatively short. In contrast, when the density of the articles C is low (e.g. when the articles C are potato chips or similar objects) the falling time of the articles C is generally relatively long. The shape of the articles C also influences the falling time of the articles C. When the falling time of the articles C is not appropriately ascertained, there is a possibility that, in the bag making and packaging machine 3, the bag B will be laterally sealed prior to the articles C arriving at the cylindrical film Fc to be made into the bag B. Additionally, when the falling time of the articles C is not appropriately ascertained, there is a possibility that, in the bag making and packaging machine 3, the time from when the articles C arrive in the cylindrical film Fc to be made into the bag B to when the bag B is laterally sealed will be set at excessively long and the efficiency of the bag making and packaging machine 3 will be thereby deteriorated. Therefore, it is preferable that detection processing of the falling time of the articles C is performed, particularly when the articles C is changed.

Next, the falling time detection processing of the articles C executed by the falling time detector 94 will be described in detail while referencing FIG. 7.

First, in step S1, it is determined whether the mode of the falling time detector 94 has been switched, by the mode switcher 93, from the falling time detection OFF mode to the first falling time detection mode or the second falling time detection mode. When the mode of the falling time detector 94 has been switched to the first falling time detection mode or the second falling time detection mode, the flow proceeds to step S2. When the mode of the falling time detector 94 has not been switched from the falling time detection OFF mode, step S1 is executed again.

In step S2, it is determined whether the mode of the falling time detector 94 has been switched, by the mode switcher 93, to the first falling time detection mode. In a case when the mode of the falling time detector 94 has been switched to the first falling time detection mode, the flow proceeds to step S3. Meanwhile, in a case when the mode of the falling time detector 94 has not been switched to the first falling time detection mode, in other words, when the mode of the falling time detector 94 has been switched to the second falling time detection mode, the flow proceeds to step S13.

Note that the first falling time detection mode is carried out when the specific weight of the articles C is relatively great. Meanwhile, the second falling time detection mode is carried out when the specific weight of the articles C is relatively small.

Next, in step S3, the mode of the falling time detector 94 is switched to the first falling time detection mode. Then, in steps S4 to S9, the first falling time detection processing is performed. Note that it is assumed that when the falling time detector 94 performs the first falling time detection processing for the falling time of the articles C, the operations of the film supplying unit 3b, the pull-down belt mechanism 14, and the vertical sealing mechanism 15 are stopped and the film F and the cylindrical film Fc are not being transported. Additionally, it is assumed that the sealing members 30a and 30b are most separated from each other at the point in time (the point in time of step S3) at which the falling time detector 94 starts the first falling time detection processing for the falling time of the articles C. Moreover, it is assumed that the sealing members 30a and 30b are disposed at the uppermost position in the up-down movement range at the point in time (the point in time of step S3) at which the falling time detector 94 starts the first falling time detection processing for the falling time of the articles C.

Figure 8A:
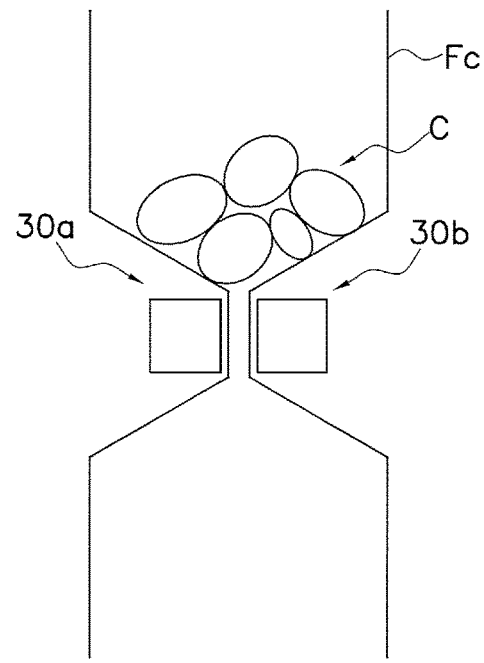
FIG. 8A is a drawing for explaining a method whereby the falling time detector illustrated in FIG. 6, in a first falling time detection mode, detects that articles have fallen to a height position of the lateral sealing mechanism.

In step S4, the second servo motor 62 drives the horizontal movement mechanism 40 of the lateral sealing mechanism 20 to cause the shutters 32a and 32b, which are an example of the first member, to move to a position at which the shutters 32a and 32b sandwich the cylindrical film Fc. That is, when switched to the first falling time detection mode, the shutters 32a and 32b are moved to a position closing the passage through which the articles C dropped and supplied from the combination weighing machine 2 pass. As a result, a state is achieved in the lateral sealing mechanism 20 in which the articles C do not fall below the shutters 32a and 32b. Since the shutters 32a and 32b are closed, the dropping articles C will fall on the sealing members 30a and 30b, as illustrated in FIG. 8A. Thereafter, step S5 is executed.

In step S5, the controller 90 causes the signal transmitter 91 to send the discharge request signal for requesting discharge of the articles C to the controller of the combination weighing machine 2.

In step S6, the combination weighing machine 2 that has received the discharge request signal discharges the articles C. The controller of the combination weighing machine 2 sends the discharge operation signal to the controller 90 at the timing at which the articles C are discharged. The signal receiver 92 of the controller 90 receives the discharge operation signal that has been sent. Thereafter, step S7 is executed.

In step S7, the torque detector 61a of the first servo motor 61 continuously detects the torque and the controller 90 receives the information related to the torque of the first servo motor 61 sent by the torque detector 61a.

In step S8, the falling time detector 94 detects that the articles C dropped from the combination weighing machine 2 have fallen to the height position of the lateral sealing mechanism 20 based on a change in the torque of the first servo motor 61, at the point in time at which, for example, the value of the torque exceeds a predetermined value.

In step S9, the falling time detector 94 calculates, as the falling time of the articles C, the time from the point in time at which the signal receiver 92 receives the discharge operation signal in step S6 to the point in time (the time at which the falling of the articles C is detected in step S8) at which the articles C dropped and supplied from the combination weighing machine 2 fall to the height position of the lateral sealing mechanism 20. Then, the first falling time detection processing ends.

In step S13, the mode of the falling time detector 94 is switched to the second falling time detection mode. Then, in steps S14 to S19, the second falling time detection processing is performed. Note that, it is assumed that when the falling time detector 94 performs the second falling time detection processing for the falling time of the articles C, the operations of the film supplying unit 3b, the pull-down belt mechanism 14, and the vertical sealing mechanism 15 are stopped and the film F and the cylindrical film Fc are not being transported. Additionally, it is assumed that the sealing members 30a and 30b are most separated from each other at the point in time (the point in time of step S13) at which the falling time detector 94 starts the second falling time detection processing for the falling time of the articles C. Moreover, it is assumed that the sealing members 30a and 30b are disposed at the uppermost position in the up-down movement range at the point in time (the point in time of step S13) at which the falling time detector 94 starts the second falling time detection processing for the falling time of the articles C.

In step S14, the controller 90 causes the signal transmitter 91 to send the discharge request signal for requesting discharge of the articles C to the controller of the combination weighing machine 2.

In step S15, the combination weighing machine 2 that has received the discharge request signal discharges the articles C. The controller of the combination weighing machine 2 sends the discharge operation signal to the controller 90 at the timing at which the articles C are discharged. The signal receiver 92 of the controller 90 receives the discharge operation signal that has been sent. Thereafter, step S16 is executed.

In step S16, the second servo motor 62 moves the sealing jaws 31a and 31b so that the pair of sealing jaws 31a and 31b repeatedly approach/separate from each other. Specifically, the second servo motor 62 drives the horizontal movement mechanism 40 of the lateral sealing mechanism 20 to cause the sealing jaws 31a and 31b, which are an example of the second member, to approach each other, and move the sealing jaws 31a and 31b to a position immediately prior to sandwiching the cylindrical film Fc. Thereafter, the second servo motor 62 drives the horizontal movement mechanism 40 of the lateral sealing mechanism 20 to cause the sealing jaws 31a and 31b to separate from each other, and move the sealing jaws 31a and 31b to a predetermined position (to a position where the articles C can freely pass between the sealing jaws 31a and 31b). The second servo motor 62 drives the horizontal movement mechanism 40 of the lateral sealing mechanism 20 to repeatedly execute this operation for the sealing jaws 31a and 31b. For example, the second servo motor 62 drives the horizontal movement mechanism 40 of the lateral sealing mechanism 20 to perform the series of approaching/separating operations for the sealing jaws 31a and 31b two times every one second.

Step S17 is executed in parallel with step S16. In step S17, the controller 90 receives the information related to the axial rotation amount of the second servo motor 62, which was sent from the encoder 62b of the second servo motor 62.

In step S18, the falling time detector 94 detects that the articles C dropped from the combination weighing machine 2 have fallen to the height position of the lateral sealing mechanism 20 based on the change in the axial rotation amount of the second servo motor 62, as specifically described below.

Figure 8B:
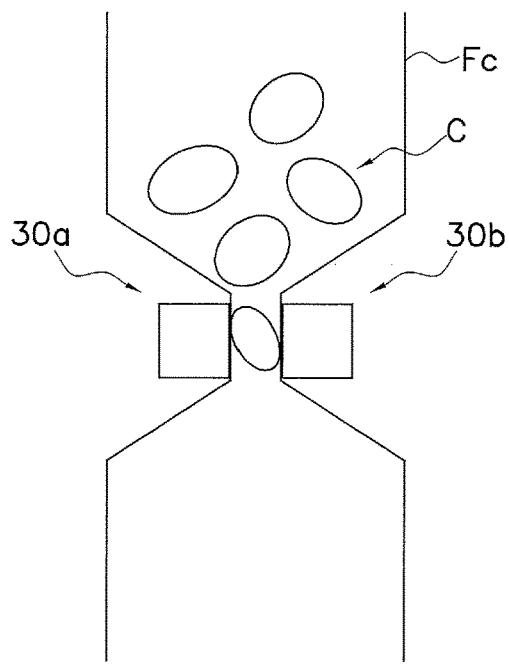
FIG. 8B is a drawing for explaining a method whereby the falling time detector illustrated in FIG. 6, in a second falling time detection mode, detects that the articles have fallen to the height position of the lateral sealing mechanism.

In cases where the second servo motor 62 causes the sealing jaws 31a and 31b to approach each other and there are no articles C that have fallen between the sealing members 30a and 30b, the sealing jaws 31a and 31b can move to the predetermined position. In other words, in cases where the second servo motor 62 causes the sealing jaws 31a and 31b to approach each other and there are no articles C that have fallen between the sealing members 30a and 30b, the axial rotation amount of the second servo motor 62 changes to a predetermined value. However, in cases where the second servo motor 62 causes the sealing jaws 31a and 31b to approach each other at the timing at which the articles C fall between the sealing members 30a and 30b, the sealing jaws 31a and 31b will bite the articles C as illustrated in FIG. 8B and, as a result, the sealing jaws 31a and 31b cannot be moved to the predetermined position. In other words, in cases where the second servo motor 62 causes the sealing jaws 31a and 31b to approach each other at the timing at which the articles C are falling between the sealing members 30a and 30b, the axial rotation amount of the second servo motor 62 does not change to the predetermined value due to the presence of the articles C. As such, biting of the articles C is detected and it is detected that the articles C dropped from the combination weighing machine 2 have fallen to the height position of the lateral sealing mechanism 20.

In step S19, the falling time detector 94 calculates the time from the point in time at which the signal receiver 92 receives the discharge operation signal in step S16 to the point in time at which the articles C dropped and supplied from the combination weighing machine 2 fall to the height position of the lateral sealing mechanism 20. Note that, at the timing at which it is detected, in step S18, that the articles C have fallen to the height position of the lateral sealing mechanism 20, there is a possibility that the articles C has already arrived between the sealing jaws 31a and 31b and a portion of the articles C has already arrived below the sealing jaws 31a and 31b. Therefore, for example, the falling time detector 94 calculates the time from the point in time at which the signal receiver 92 receives the discharge operation signal in step S15 to the point in time at which the biting of the sealing jaws 31a and 31b is detected in step S18, and subtracts the time needed for one cycle of the open/close operations of the sealing jaws 31a and 31b in step S16 to calculate the falling time of the articles C. Then, the second falling time detection processing is ended.

(5) FEATURES

The features of the bag making and packaging machine 3 according to this embodiment will be described.

5-1

The bag making and packaging machine 3 according to this embodiment receives the articles C dropped and supplied from the combination weighing machine 2, which is an example of the article supply device, disposed above the bag making and packaging machine 3, and packages the articles C in the bag B to be made. The bag making and packaging machine 3 includes the lateral sealing mechanism 20, the servo motor 60, and the falling time detector 94. The lateral sealing mechanism 20 laterally seals the cylindrical film Fc, which is an example of the packaging material formed into the cylindrical shape. The servo motor 60 drives the lateral sealing mechanism 20. The falling time detector 94 detects that the articles C dropped from the combination weighing machine 2 have fallen to the height position of the lateral sealing mechanism 20 based on the information related to the torque of the servo motor 60. Additionally, the falling time detector 94 detects that the articles C dropped from the combination weighing machine 2 have fallen to the height position of the lateral sealing mechanism 20 based on the information related to the axial rotation amount of the servo motor 60.

In this case, it is possible to detect that the articles C have fallen to the height position of the lateral sealing mechanism 20 without additionally providing a sensor. As such, it is possible to accurately detect that the articles C have fallen to the height position of the lateral sealing mechanism 20 while suppressing the cost of the machine.

5-2

In the bag making and packaging machine 3 according to this embodiment, the lateral sealing mechanism 20 includes the shutters 32a and 32b that move within the passage through which the articles C dropped and supplied from the combination weighing machine 2 pass. The shutters 32a and 32b are examples of the first member. The servo motor 60 includes the first servo motor 61. The first servo motor 61 drives the shutters 32a and 32b in the vertical direction within the passage through which the articles C dropped and supplied from the combination weighing machine 2 pass. The falling time detector 94 detects that the articles C dropped from the combination weighing machine 2 have fallen to the height position of the lateral sealing mechanism 20 based on the information related to the torque of the first servo motor 61.

In this case, it is possible to detect that the articles C have fallen to the height position of the lateral sealing mechanism 20 based on the force in the vertical direction acting on the shutters 32a and 32b.

5-3

The bag making and packaging machine 3 according to this embodiment includes the mode switcher 93. The mode switcher 93 switches between the first falling time detection mode in which the falling time detector 94 is operated and the falling time detection OFF mode in which the falling time detector 94 is not operated. The first falling time detection mode is an example of the first mode. The falling time detection OFF mode is an example of the second mode. When switched by the mode switcher 93 to the first falling time detection mode, the shutters 32a and 32b are moved to the position closing the passage through which the articles C dropped and supplied from the combination weighing machine 2 pass.

In this case, it is possible to detect that the articles C have fallen to the height position of the lateral sealing mechanism 20 by detecting the falling of the articles C on the shutters 32a and 32b based on the information related to the torque of the first servo motor 61.

5-4

With the bag making and packaging machine 3 according to this embodiment, the lateral sealing mechanism 20 includes the sealing jaws 31a and 31b that move within the passage through which the articles C dropped and supplied from the combination weighing machine 2 pass. The sealing jaws 31a and 31b are examples of the second member. The servo motor 60 includes the second servo motor 62. The second servo motor 62 drives the sealing jaws 31a and 31b in the horizontal direction within the passage through which the articles C dropped and supplied from the combination weighing machine 2 pass. The falling time detector 94 detects that the articles C dropped from the combination weighing machine 2 have fallen to the height position of the lateral sealing mechanism 20 based on the information related to the axial rotation amount of the second servo motor 62.

In this case, it is possible to detect that the articles C have fallen to the height position of the lateral sealing mechanism 20 based on the movement amount in the horizontal direction acting on the sealing jaws 31a and 31b.

5-5

The bag making and packaging machine 3 according to this embodiment includes the mode switcher 93. The mode switcher 93 switches between the second falling time detection mode in which the falling time detector 94 is operated and the falling time detection OFF mode in which the falling time detector is not operated. The second falling time detection mode is an example of the third mode. When switched by the mode switcher 93 to the second falling time detection mode, the second servo motor 62 moves the pair of sealing jaws 31a and 31b so that the pair of sealing jaws 31a and 31b repeatedly approach/separate from each other. In this case, it is possible to detect that the articles C have fallen to the height position of the lateral sealing mechanism 20 by detecting a state that the articles C are sandwiched between the pair of sealing jaws 31a and 31b (i.e., biting of the articles C), based on the information related to the axial rotation amount of the second servo motor 62.

5-6

The bag making and packaging machine 3 according to this embodiment includes the signal receiver 92. The signal receiver 92 receives the discharge operation signal sent at the timing at which the combination weighing machine 2 discharges the articles C. The falling time detector 94 calculates the time from the point in time at which the signal receiver 92 receives the discharge operation signal to the point in time at which the articles C dropped and supplied from the combination weighing machine 2 fall to the height position of the lateral sealing mechanism 20.

In this case, the time from when the combination weighing machine 2 discharges the articles C to when the articles C arrive at the height position of the lateral sealing mechanism 20 is calculated. Since this time is used, the operation timing of the lateral sealing mechanism 20 and the discharge timing of the articles C can be accurately adjusted.

5-7

The bag making and packaging machine 3 according to this embodiment includes the signal transmitter 91. The signal transmitter 91 sends, to the combination weighing machine 2, the discharge request signal for requesting the discharge of the articles C.

In this case, it is possible to accurately adjust the discharge timing of the articles C based on the detection results that the articles C have fallen to the height position of the lateral sealing mechanism 20.

(6) MODIFICATION EXAMPLES

Next, modification examples will be described. Note that, multiple modification examples may be appropriately combined, provided that the modification examples to be combined do not conflict with each other.

(6-1) Modification Example A

In the embodiment described above, in the first falling time detection mode, the falling time detector 94 detects that the articles C dropped from the combination weighing machine 2 have fallen to the height position of the lateral sealing mechanism 20 based on the information related to the torque of the first servo motor 61. However, the configuration of the falling time detector 94 is not limited thereto.

The falling time detector 94 may be configured to, in the first falling time detection mode, detect that the articles C dropped from the combination weighing machine 2 have fallen to the height position of the lateral sealing mechanism 20 based on the information related to the axial rotation amount of the first servo motor 61. That is, the falling time detector 94 is configured to detect the movement of the shutters 32a and 32b based on the information related to the rotation amount of the first servo motor 61 when the shutters 32a and 32b are moved downward when the articles C fall on the shutters 32a and 32b and, thereby, detect that the articles C dropped from the combination weighing machine 2 have fallen to the height position of the lateral sealing mechanism 20.

Also, in the embodiment described above, in the second falling time detection mode, the falling time detector 94 detects that the articles C dropped from the combination weighing machine 2 have fallen to the height position of the lateral sealing mechanism 20 based on the information related to the axial rotation amount of the second servo motor 62. However, the configuration of the falling time detector 94 is not limited thereto.

The falling time detector 94 may be configured to, in the second falling time detection mode, detect that the articles C dropped from the combination weighing machine 2 have fallen to the height position of the lateral sealing mechanism 20 based on the information related to the torque of the second servo motor 62. That is, the falling time detector 94 may be configured to use the fact that the torque of the second servo motor 62 increases when the articles C are sandwiched between the sealing jaws 31*a* and 31*b* to detect that the articles C dropped from the combination weighing machine 2 have fallen to the height position of the lateral sealing mechanism 20.

(6-2) Modification Example B

In the embodiment described above, the sealing members 30*a* and 30*b* include the shutters 32*a* and 32*b* as components, but the configuration is not limited thereto. A configuration is possible in which the sealing members 30*a* and 30*b* do not include the shutters 32*a* and 32*b*.

The falling time detector 94 may be configured to, in the first falling time detection mode, move the sealing jaws 31*a* and 31*b*, which are an example of the first member, to the position closing the passage through which the articles C dropped and supplied from the combination weighing machine 2 pass, and detect that the articles C have fallen on the sealing jaws 31*a* and 31*b* based on the information related to the torque of the first servo motor 61.

(6-3) Modification Example C

With the lateral sealing mechanism 20 of the embodiment described above, the sealing members 30*a* and 30*b* execute so-called box motion, that is, the sealing members 30*a* and 30*b* are moved so as to approach/separate from each other in the front-back direction and are also moved in the up-down direction. However, the motion of the lateral sealing mechanism 20 is not limited thereto.

For example, a configuration is possible in which, as illustrated in FIG. 9, the sealing members 30*a* and 30*b* of the lateral sealing mechanism execute operation known as D motion, that is, the sealing members 30*a* and 30*b* are pivot-driven in a D-shape (when viewed from the side). Just as in the embodiment described above, in this case as well, it is possible to detect that the articles C have fallen to the height position of the lateral sealing mechanism based on the information related to the torque or the information related to the axial rotation amount of the servo motor driving the lateral sealing mechanism.

Additionally, a configuration is possible in which, for example, the lateral sealing mechanism only moves the sealing members 30*a* and 30*b* so as to approach/separate from each other in the front-back direction. That is, a configuration is possible in which the lateral sealing mechanism does not include the vertical movement mechanism 50 of the embodiment described above. In this case, the falling time detector 94 may be configured to only have the second falling time detection mode as the falling time detection ON mode, and detect that the articles C dropped from the combination weighing machine 2 have fallen to the height position of the lateral sealing mechanism 20 based on the information related to the torque or the axial rotation amount of the second servo motor 62.

(6-4) Modification Example D

In the embodiment described above, the falling time detector 94 calculates the falling time of the articles C only one time in each of the first falling time detection mode and the second falling time detection mode, but the number of times of calculation is not limited thereto. For example, a configuration is possible in which the falling time detector 94 performs the first falling time detection processing and the second falling time detection processing a plurality of times in the first falling time detection mode and the second falling time detection mode, and ultimately calculates the maximum value, average value, or the like of the resulting falling times of the articles C as the falling time of the articles C.

(6-5) Modification Example E

The falling time detector 94 may, for example, perform the following falling time detection processing to calculate the falling time of the articles C in the second falling time detection mode.

Figure 7:
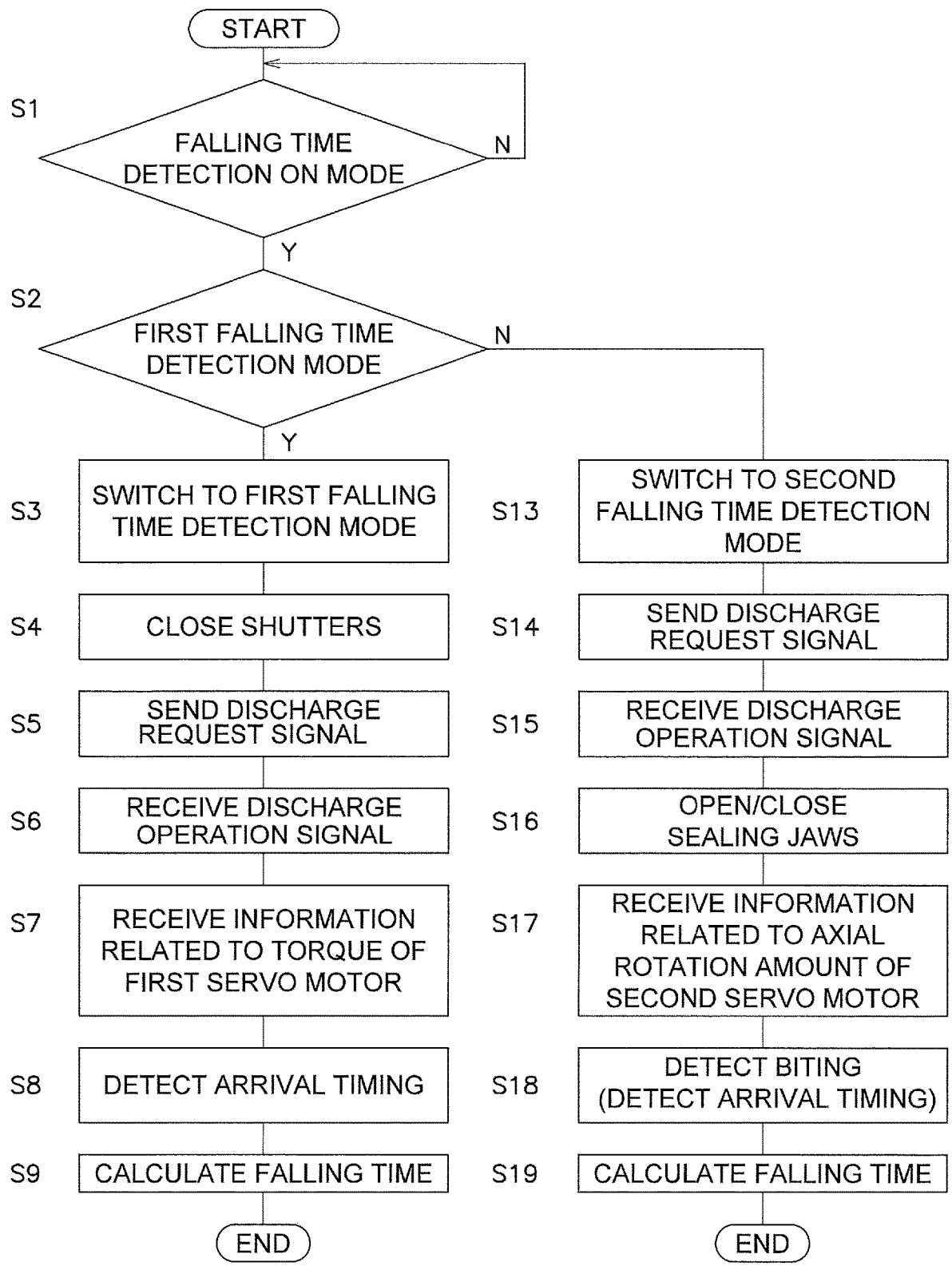
FIG. 7 is a flowchart of falling time detection processing performed by the bag making and packaging machine illustrated in FIG. 1.

In the embodiment described above, the signal receiver 92 receives the discharge operation signal in step S15 of the flowchart of FIG. 7 and, on the basis thereof, the falling time detector 94 starts the open/close operation of the sealing jaws 31*a* and 31*b* at a predetermined timing in step S16. Then, the second falling time detection processing of steps S14 to S19 is performed only one time.

In contrast, in the second falling time detection mode according to Modification Example E, the second falling time detection processing of steps S14 to S19 is performed a plurality of times. When performing the second falling time detection processing a plurality of times, the second falling time detection processing is performed by shifting, little by little, the timing from the receipt of the operation signal in step S15 to the starting of the open/close operations of the sealing jaws 31*a* and 31*b* in step S16 (e.g. the start timing of the open/close operation is shifted by one fifth of the open/close cycle time of the sealing jaws 31*a* and 31*b*). Then, the falling time detector 94 ultimately calculates the maximum value, the average value, or the like of the resulting falling times of the articles C as the falling time of the articles C based on the results obtained by performing the second falling time detection processing a plurality of times while shifting, little by little, the timing at which the open/close operation of the sealing jaws 31*a* and 31*b* is started.

INDUSTRIAL APPLICABILITY

The bag making and packaging machine according to certain implementations may be useful as a bag making and packaging machine capable of accurately detecting, with a simple configuration, the timing at which articles that are dropped and supplied from an article supply device, disposed above the bag making and packaging machine, will arrive at a lateral sealing mechanism.

The invention claimed is:
1. A bag making and packaging machine for receiving an article dropped and supplied from an article supply device disposed above the bag making and packaging machine and for packaging the article in a bag to be made, the bag making and packaging machine comprising:

a lateral sealing mechanism configured to laterally seal a packaging material of a cylindrical shape;
a servo motor configured to drive the lateral sealing mechanism; and
a falling time detector configured to detect a time for the article dropped from the article supply device to fall to a height position of the lateral sealing mechanism based on information related to a torque or an axial rotation amount of the servo motor, wherein
the lateral sealing mechanism includes a first member that moves within a passage through which the article dropped and supplied from the article supply device passes,
the servo motor includes a first servo motor configured to drive the first member in at least a vertical direction within the passage, and
the falling time detector is further configured to calculate a falling time for the article dropped from the article supply device to fall to the height position of the lateral sealing mechanism by detecting a time for the article dropped from the article supply device to fall on the first member of the lateral sealing mechanism based on information related to a torque or an axial rotation amount of the first servo motor.

2. The bag making and packaging machine according to claim 1, further comprising:
a mode switcher configured to switch between a first mode in which the falling time detector is operated and a second mode in which the falling time detector is not operated,
wherein
when switched to the first mode, the first member is moved to a position closing the passage.

3. The bag making and packaging machine according to claim 1, further comprising:
a signal receiver configured to receive a discharge operation signal sent at a timing at which the article supply device discharges the article,
wherein
the falling time detector further calculates a time from a point in time at which the signal receiver receives the discharge operation signal to a point in time at which the article dropped and supplied from the article supply device falls to the height position of the lateral sealing mechanism.

4. The bag making and packaging machine according to claim 1, further comprising:
a signal transmitter configured to send a discharge request signal to the article supply device for requesting a discharge of the article.

* * * * *